(12) United States Patent
López Maeso et al.

(10) Patent No.: US 10,626,310 B2
(45) Date of Patent: Apr. 21, 2020

(54) FAST LIGHT CURING CYANOACRYLATE COMPOSITIONS

(71) Applicant: AFINITICA TECHNOLOGIES, S.L., Cerdanyola del Vallés (ES)

(72) Inventors: Juan Andrés López Maeso, Cerdanyola del Vallés (ES); Ciaran McArdle, Cerdanyola del Vallés (ES); Cristina Monfort Fraga, Cerdanyola del Vallés (ES); Verónica De La Fuente Molina, Cerdanyola del Vallés (ES); Arnau Pejoan Jiménez, Cerdanyola del Vallés (ES); Vladimir Tchaplinski, Cerdanyola del Vallés (ES)

(73) Assignee: AFINITICA TECHNOLOGIES, S.L., Cerdanyola del Vallés (ES)

( * ) Notice: Subject to any disclaimer, the term of this patent is extended or adjusted under 35 U.S.C. 154(b) by 184 days.

(21) Appl. No.: 15/748,845

(22) PCT Filed: Feb. 25, 2016

(86) PCT No.: PCT/IB2016/051024
§ 371 (c)(1),
(2) Date: Jan. 30, 2018

(87) PCT Pub. No.: WO2017/021785
PCT Pub. Date: Feb. 9, 2017

(65) Prior Publication Data
US 2018/0215973 A1    Aug. 2, 2018

(30) Foreign Application Priority Data

Jul. 31, 2015   (EP) .................................... 15382408

(51) Int. Cl.
*C09J 175/14*    (2006.01)
*C08F 220/18*    (2006.01)
(Continued)

(52) U.S. Cl.
CPC ............... *C09J 175/14* (2013.01); *C07F 7/30* (2013.01); *C07F 17/02* (2013.01); *C08F 220/18* (2013.01);
(Continued)

(58) Field of Classification Search
CPC  C09J 11/08; C09J 11/04; C09J 175/14; C07F 17/02; C07F 7/30
See application file for complete search history.

(56) References Cited

U.S. PATENT DOCUMENTS 2,794,788 A    6/1957   Coover et al.
3,282,773 A   11/1966   Wicker, Jr. et al.
(Continued)

FOREIGN PATENT DOCUMENTS

EP    0 210 052 A2    1/1987
EP    0 323 720 A1    7/1989
(Continued)

OTHER PUBLICATIONS

S. Ebnesajjad Ed., "Adhesives Technology Handbook", 2008, 2nd edition, by William Andrew Inc., Norwich, NY, USA; 387 pgs.
(Continued)

*Primary Examiner* — Daniel McNally
(74) *Attorney, Agent, or Firm* — Maier & Maier, PLLC

(57) ABSTRACT

Fast light curing adhesive compositions, which include cyanoacrylate or methylidene malonate monomers or mixtures thereof, and either a photoinitiator system with a combination of specific ferrocene compounds and specific acylgermane compounds or a photoinitiator system with a specific ferrocene compound substituted with acylgermane groups. The use of that light curable adhesive composition, and a package.

20 Claims, 3 Drawing Sheets

(51) Int. Cl.
*C08F 222/32* (2006.01)
*C07F 7/30* (2006.01)
*C07F 17/02* (2006.01)
*C09J 11/04* (2006.01)
*C09J 11/08* (2006.01)
*C09D 4/00* (2006.01)
*C09J 4/00* (2006.01)
*C08K 3/16* (2006.01)
*C08K 3/30* (2006.01)
*C08K 3/38* (2006.01)
*C08L 27/06* (2006.01)
*C08L 31/04* (2006.01)
*C08L 33/12* (2006.01)
*C09J 133/08* (2006.01)
*C09J 167/06* (2006.01)

(52) U.S. Cl.
CPC ............ *C08F 222/32* (2013.01); *C09J 11/04* (2013.01); *C09J 11/08* (2013.01); *C08K 3/16* (2013.01); *C08K 3/30* (2013.01); *C08K 3/38* (2013.01); *C08L 27/06* (2013.01); *C08L 31/04* (2013.01); *C08L 33/12* (2013.01); *C09D 4/00* (2013.01); *C09J 4/00* (2013.01); *C09J 133/08* (2013.01); *C09J 167/06* (2013.01); *C09J 2205/31* (2013.01)

(56) References Cited

U.S. PATENT DOCUMENTS

| | | | |
|---|---|---|---|
| 3,699,127 | A | 10/1972 | O'Sullivan et al. |
| 4,102,945 | A | 7/1978 | Gleave |
| 4,171,416 | A | 10/1979 | Motegi et al. |
| 4,321,180 | A | 3/1982 | Kimura et al. |
| 4,444,933 | A | 4/1984 | Columbus et al. |
| 4,837,260 | A | 6/1989 | Sato et al. |
| 4,906,317 | A | 3/1990 | Liu |
| 4,980,086 | A | 12/1990 | Hiraiwa et al. |
| 6,010,714 | A | 1/2000 | Leung et al. |
| 6,127,445 | A * | 10/2000 | Kutal .................. C07F 17/02 522/36 |
| 6,245,933 | B1 | 6/2001 | Malofsky et al. |
| 6,503,959 | B1 | 1/2003 | Nishiyama et al. |
| 6,794,471 | B2 | 9/2004 | Ohkuma et al. |
| 6,977,278 | B1 | 12/2005 | Misiak |
| 9,022,256 | B2 | 5/2015 | Offermann |
| 9,038,857 | B2 | 5/2015 | Chen |
| 2003/0162857 | A1 | 8/2003 | Wojciak et al. |
| 2008/0314519 | A1* | 12/2008 | Attarwala .......... C09J 123/0869 156/331.8 |
| 2015/0080490 | A1 | 3/2015 | Burtscher et al. |
| 2015/0111176 | A1 | 4/2015 | Wachter et al. |

FOREIGN PATENT DOCUMENTS

| | | |
|---|---|---|
| EP | 0 769 721 A1 | 4/1997 |
| EP | 1 749 513 A1 | 2/2007 |
| EP | 1 905 415 A1 | 4/2008 |
| EP | 2 927 209 A1 | 10/2015 |
| KR | 10-2012-0128004 A | 11/2012 |
| KR | 10-2012-0131802 A | 12/2012 |
| WO | 98/38260 A1 | 9/1998 |
| WO | 00/47242 A1 | 8/2000 |
| WO | 01/12243 A1 | 2/2001 |
| WO | 03/064483 A1 | 8/2003 |
| WO | 2004/061030 A1 | 7/2004 |
| WO | 2007/049258 A1 | 5/2007 |
| WO | 2010/046412 A1 | 4/2010 |
| WO | 2014/126834 A2 | 8/2014 |
| WO | 2015/150882 A1 | 10/2015 |

OTHER PUBLICATIONS

J. C. Bevington et al., "Polymerization of Methyl α-Cyanoacrylate—II", European Polymer Journal, 1976, p. 255-267, vol. 12; 3 pgs.

William E. Cloete et al., "Fast underwater bonding to polycarbonate using photoinitiated cyanoacrylate", International Journal of Adhesion and Adhesives, 2010, p. 208-213, vol. 30; 6 pgs.

Yoshikazu Yamaguchi et al., "Benzoyl-Substituted Ferrocenes: An Attractive New Class of Anionic Photoinitiators", Macromolecules, 2000, p. 1152-1156, vol. 33; 5 pgs.

Yoshikazu Yamaguchi et al., "Electronic structure, spectroscopy, and photochemistry of group 8 metallocenes", Coordination Chem. Rev., 2007, p. 515-524, vol. 251; 10 pgs.

A. Ciechacka, "Analysis and Characterisation of an Acylphosphine Oxide Photoinitiator", PhD thesis, Dublin City University, 2011; 228 pgs.

Hemant K. Sharma et al., "Organometalloidal derivatives of the transition metals XXVII. Chemical and structural Investigations on (ferrocenylacyl) germanes", J. Organomettalic Chem, 1991, p. 321-330, vol. 409; 10 pgs.

Pascal Breton et al., "Biocompatible poly(methylidene malonate)-made materials for pharmaceutical and biomedical applications", Eur. J. Pharmaceutics & Biopharmaceutics, 2008, p. 479-495, vol. 68; 17 pgs.

Three Bond Co. Ltd, "ThreeBond Technical New 34", Jun. 20, 1991, Tokyo 193-8533, Japan; 10 pgs.

Stefan Zürcher et al., "Germanium-containing ferrocenes and ferrocenophanes. Potential precursors for ring-opening polymerizations and 'germaferrocenes'", Inorganica Chimica Acta, 1999, p. 355-364, vol. 291; 10 pgs.

International Search Report dated May 6, 2016 from corresponding International Application No. PCT/IB2016/051024; 4 pgs.

PCT Written Opinion dated May 6, 2016 from corresponding International Application No. PCT/IB2016/051024; 6 pgs.

* cited by examiner

FAST LIGHT CURING CYANOACRYLATE COMPOSITIONS

FIELD

The present invention relates to light curing adhesive compositions comprising cyanoacrylate or methylidene monomers or mixtures thereof and specific photoinitiators, which show dual curing capabilities and which find applications in assembly adhesives, sealants, bulk curing resins and industrial and cosmetic coatings.

BACKGROUND

Cyanoacrylates (CAs) is the generic name for a family of resistant fast acting adhesives based on esters of 2-cyanoacrylic acid. The structure of the monomer is as follows:

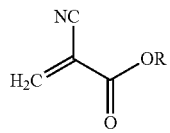

wherein R is usually an alkyl group such as, for example, methyl, ethyl, butyl, or octyl, or an alkoxyalkyl group, for example, 2-methoxyethyl or 2-ethoxyethyl.

Such compounds have been well known for some time, as described in, for example, S. Ebnesajjad Ed., *Adhesives Technology Handbook*, William Andrew, Norwich, 2008.

CAs are the reactive monomers and the main components of so-called 'super glues' or 'instant adhesives'. They are unique with regard to speed of cure and ability to bond almost every substrate most generally without the need for an additional energy stimulus such as heat or light. This type of adhesive is widely used by consumers, professional craft workers and in industrial assembly applications.

Methylidene malonates are another class of related instantly polymerisable monomer, they are acrylates but with a second ester group on the alpha carbon atom as disclosed in, for example, KR-A-2012/0131802 or KR-A-2012/0128004.

In certain applications instantly polymerizing monomers exhibit some disadvantages that detract from the even greater applicability for these materials. One disadvantage exhibited by CAs relates to the presence of uncured excess adhesive outside a bonded part. Uncured material will stick to anything else that comes in contact with it—for example finished or semi-finished goods, machine parts, operator's hands etc. This problem has been addressed by dual curing CAs and partly resolved with the advent of light- or photo-curing CAs. Whereas CAs generally need no assistance when curing tightly fitting parts, they benefit from means to enable cure in bulk, or outside tightly fitting parts, for example to seal joints and prevent inadvertent adhesion to anything that may contact the parts to which glue is applied. A typical example of where a secondary curing mechanism is invoked is in the assembly of medical devices, for example, when hypodermic needles are mounted into the hubs of syringes in a fast running production process. In the latter case, the CA must still function normally (that is, cure as an instant adhesive without light), but additional ultraviolet (UV) curing enables full and fast cure of any excess adhesive and effectively seals and strengthens the joined parts.

Certain CA compositions with an additional light cure capability have been described in prior art and a few specific types are articles of commerce, but several problems remain unsolved, such as the provision of a rapidly curing composition mediated indirectly through a photoinitiated radical mechanism, as mentioned in International patent application WO-A-03/064483.

A first problem relating to current light curing CAs results from the mechanism of cure. CAs polymerize easily by nucleophilic, anionic or zwitterionic mechanisms, and do not respond in a practical manner to free radical homo- or copolymerization unlike common acrylates, like methyl methacrylate or butyl acrylate, among others. Thus it is necessary first to suppress the more dominant anionic cure to invoke true radical homopolymerisation of CAs, by addition of acidic materials as noted by Bevington et al., European Polymer Journal, 1976, 12, 255-267, for methyl cyanoacrylate, after which homopolymerisation could be induced thermally in the presence of radical initiators at 60° C.

In Cloete et al., International Journal of Adhesion and Adhesives, 2010, 30(4), 208-213, the use of dibenzoylferrocene as an anionic photoinitiator of ethyl 2-cyanoacrylate (ECA) is disclosed. In Yamaguchi et al., Macromolecules, 2000, 33, 1152-1156, mono- and dibenzoylferrocenes have been demonstrated to be photoinitiators for CA when used alone. However these compounds are highly coloured and do not exhibit useful long-term stability and are not suited to commercial formulations. In Yamaguchi et al., Coordination Chem. Rev, 2007, 251, 515-524 the use of ruthenocene is disclosed as well as its benzoyl derivatives as sole initiators for CA photopolymerisation that are faster than equivalent sole iron based equivalents. However these suffer the some of the same difficulties as their ferrocene analogues when used as sole components in a photoinitiator system with regard to lack of long term stability and furthermore they are highly expensive.

In International patent application WO-A-98/38260 a radiation-curable composition comprising a CA component, a metallocene component and radical photoinitiator components such as acylphosphine oxides, among others, is disclosed. According to A. Ciechacka, "Analysis and Characterisation of an Acylphosphine Oxide Photoinitiator", PhD thesis, Dublin City University, 2011, the radical photoinitiator alone does not invoke effective CA polymerization directly, but rather serves to facilitate the subsequent creation of the eventual initiating species suited to CA polymerization.

A serious disadvantage of the requisite acylphosphine oxide radical initiators is their susceptibility to hydrolysis in acidic conditions as highlighted in the abovementioned thesis study and also indicated in related systems (dental materials) in European patent application EP-A-1749513. This process results in premature decomposition of this co-initiator component even in the dark, leading to formulations that lose photosensitivity with storage time, and formulations that require refrigerated storage to achieve acceptable shelf life—in sum, unstable or unworkable CA formulations. It is to be noted that reactive CA formulations must be stabilised by small amounts of strong acids, so formulation components in CAs must be acid stable.

A second problem relating to light curing CAs results from the nature of the CA monomer per se. The most widely used monomer in all categories of instant adhesives is ethyl CA (ECA). In the specialized category of light curing CAs, only ECA versions are commercially available (such as Loctite® 4305, 4310, 4311, Threebond® 1771E, 1773E, TB1741), even though reference is made to other CA types as disclosed, for example, in European patent application EP-A-0769721, yet no examples have ever been provided. In very many situations ECA based adhesives are fit for purpose, however in certain circumstances other types may be preferred. ECA possess a relatively high vapour pressure, is a strong lachrymator and must be labelled as an irritant. High vapour pressure gives rise to a white staining (so-called 'blooming') when polymerized vapours condense on parts generating unsightly marks on manufactured goods. Lachrymatory characteristics make it difficult to work with ECA on a continuous basis except when used in automated and properly ventilated systems. Both lachrymatory and irritant properties mean that ECA based formulations are less well suited to large area coating applications where large open surfaces are exposed or to application in domestic situations. All of these issues pertain not only to general ECA based instant adhesives, but also to light curing versions based on this monomer, so that even if normal applications of ECA do not include application to large open surfaces, such monomers would still present problems if light curing coatings were to be derived from them. Odourless, non-staining, non-irritant instant adhesives are well known, as disclosed for example in U.S. Pat. No. 4,321,180, based on monomers such as the alkoxyalkyl CAs, for example, methoxyethyl CA (MECA). However light curing versions of MECA are not commercially available. Even though reference has been made to such materials in the prior art of light curing ECA formulations, the reality is that alkoxyalkyl CAs are inherently sensitive to autoxidation which raises additional problems as disclosed in U.S. Pat. No. 4,321,180. Stable alkoxyalkyl CA formulations thus require special attention to radical stabilization, which further complicates formulating light-curing versions, particularly those containing mixtures with either radical co-initiators, or with radically polymerisable acrylic co-monomers.

For ECA formulations, even if suboptimal with regard to every desirable product attribute, it still would be highly desirable to further optimize light sensitive versions using this monomer, for example, for bulk cure. However, to have access to stable, odourless, non-staining, non-irritant, fast light curing alkoxyalkyl CAs, especially with good sensitivity to visible light would be still more desirable. The latter would be uniquely practical for coating applications and have the significant advantage over:
a) conventional light curing acrylic materials, since CA polymerization is not inhibited by ambient air and hence they cure 'dry-to-touch', or 'tack free' under normal conditions even in ultrathin coatings and,
b) current or improved light curing ECA formulations due to their non-irritant, non-lachrymatory nature.

The combination of visible light sensitivity, lack of odour and non-irritant character would make MECA based formulations particularly important for large surface coating, or coating in normal ambient conditions for example, in cosmetic applications for nail lacquers for home or salon use, or for use as bulk resins in 3 dimensional printing (3DP) or so-called or so-called Continuous Liquid Interface Printing (CLIP), as disclosed in International patent application WO-A-2014/126834, especially for office based use.

A further potential problem relating to light curing CAs relates to the performance of the final cured materials. Currently commercially available photocurable ECA formulations do not crosslink upon cure. Non-crosslinked cured adhesives have limited durability and in some applications this feature is required, for example if bonded parts have to be sterilized under arduous conditions then they must be robust, or if bulk cured material require high mechanical integrity, then robustness is advantageous. Crosslinking may be required in resin and sealant applications and even to a degree in temporary coatings, such as cosmetic lacquers or protective coatings where durability in the form of scratch resistance is desirable at least for a while. For more robust resins, adhesives, sealants and coatings, photocrosslinking of part or all of the formulation by homo- or co-polymerization would be highly advantageous irrespective of CA type.

There is, thus, a particular need in the CA formulation art, for a light sensitive initiating system that is stable in acidic conditions over prolonged times and is preferably sensitive to both ultraviolet light (UV) and visible light (VL), and which is suitable for preparing multipurpose cured bulk material or films.

SUMMARY

The object of the present invention is a light curable adhesive composition.

Also part of the invention is the use of that light curable adhesive composition.

Also part of the invention is a package comprising that light curable adhesive composition.

DETAILED DESCRIPTION OF THE INVENTION

Figure 1:
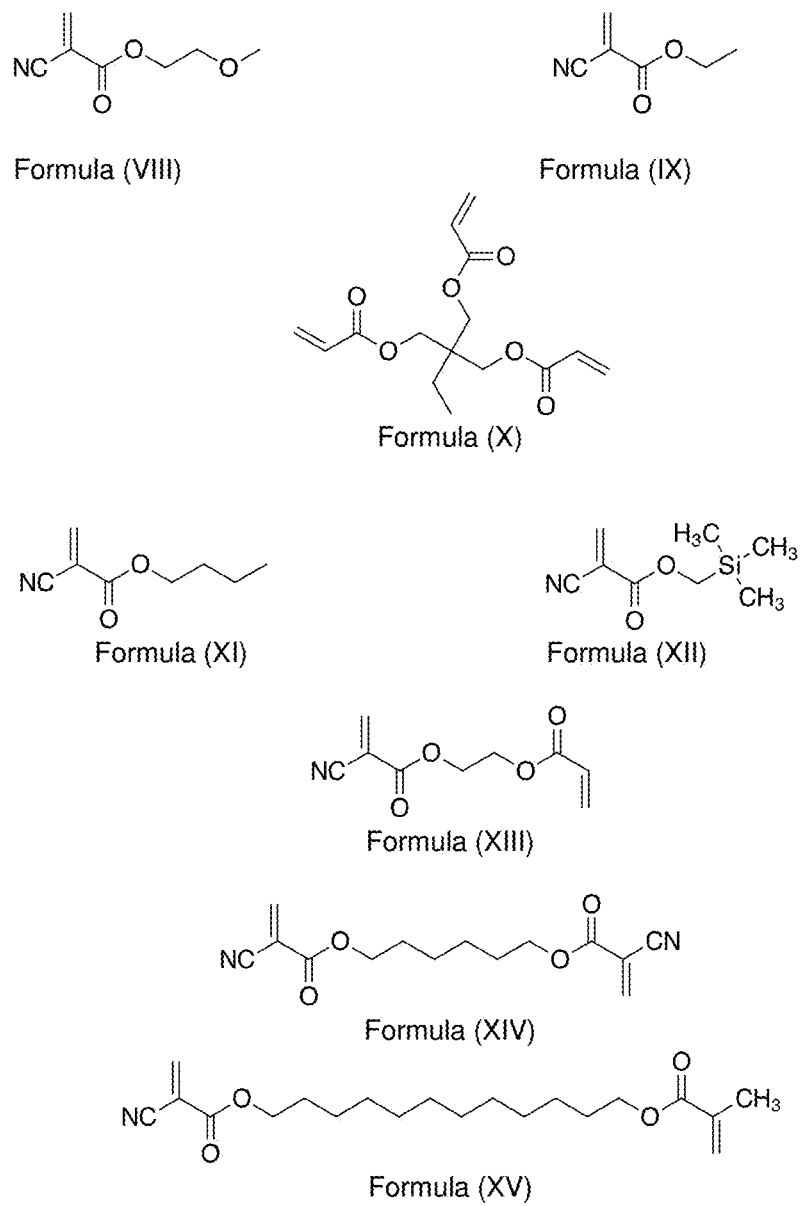
FIG. 1 includes formulae of compounds (VIII) to (XV).

The object of the present invention is a light curable adhesive composition comprising:
1) a photoinitiator system selected from
a) a combination of ferrocene compound of formula (I)

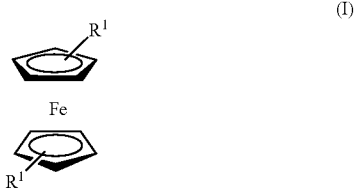

wherein
$R^1$ is hydrogen or $C_1$-$C_4$ alkyl;
one or more $R^1$ groups are present in one or both cyclopentadienyl rings, and acylgermane compounds selected from compounds of formula (II) or (III):

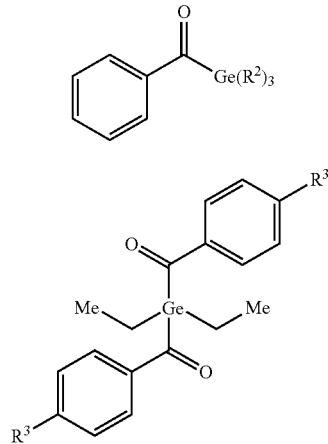

wherein
R² is methyl or phenyl, and
R³ is hydrogen or methoxy, and
b) acylgermane compound of formula (IV)

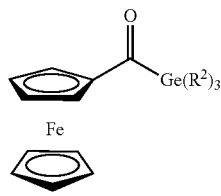

wherein
R² is as defined above, optionally combined with a radical photoinitiator,
2) at least one compound of formula (V)

wherein
A is selected from the group consisting of CN, $CO_2Me$ and $CO_2Et$, and
when A is $CO_2Me$, D is $CO_2Me$;
when A is $CO_2Et$, D is $CO_2CH_2CO_2Et$;
when A is $CO_2Et$, D is $CO_2Et$; and
when A is CN, D is a carboxylic ester moiety $CO_2R^4$, wherein
R⁴ is selected from the group consisting of: $C_1$-$C_{18}$ linear or branched alkyl chain, terminally trimethylsilylated $C_1$-$C_3$ alkyl chain, partially fluorinated —$CH_2CF_3$, —$CH_2CF_2CF_3$, —$CH_2(CF_2)_2H$, —$CH_2(CF_2)_4H$, —$CH(CF_3)CH_3$, allyl, propargyl, cyclohexyl, cyclohexenyl, methylcyclohexyl, methylcyclohexenyl, ethylcyclohexyl, ethylcyclohexenyl, furfuryl, phenylethyl, phenoxyethyl, an acrylic ester moiety of formula (VI):

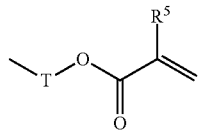

wherein
T is: $(CH_2)_z$, wherein the value of z is between 2 and 12 inclusive, or $C_3$-$C_{12}$ branched alkyl chain, preferably $C_3$-$C_8$, and more preferably $C_3$-$C_6$, cyclohexyl; bisphenyl, bisphenol, and R⁵ is H, Me, CN or $CO_2R^6$, wherein R⁶ is a methyl or ethyl group;
a group of formula (VII)

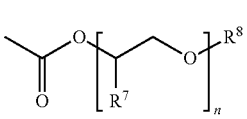

wherein
R⁷ is selected from the group consisting of H and Me, R⁸ is selected from the group consisting of $Si(Me_3)_3$, and a $C_1$-$C_6$ linear or branched alkyl chain, and the value of n is between 1 and 3 inclusive, and
3) at least one acid stabilizer compound selected from the group of Lewis acids.

The authors of the present invention have developed a light curing adhesive composition including low concentrations of ferrocene and acylgermane species, combined or as conjoined species, which, surprisingly, shows an efficient and complete photopolymerization in few seconds exposure to ultraviolet or visible light irradiation, yielding dry-to-touch, glossy and extensibly colourless films. A further advantage of the composition of the invention is that acylgermane photoinitiators are acid stable and CA or methylidene malonate formulations are acid stabilized albeit at low levels of acids. Moreover, the high compatibility of the photoinitiator system with a broad variety of monomers allows the design of adhesives and coatings with specific structural features suitable for different applications in assembly, in sealing, in bulk curing resins and as industrial and cosmetic coatings. In this sense, the eventual crosslinking between monomers provides higher durability of the cured compositions.

In the present description as well as in the claims, the singular forms "a" and "an" include also the plural reference unless the context clearly indicates otherwise.

In this description, the percentages (%) are expressed in weight/weight unless otherwise indicated, and in the compositions, the sum of the percentages of the different components are adjusted to add up to 100%.

Ferrocene Compounds

In the composition of the invention, compound of formula (I) is the ferrocene compound, which in combination with acylgermane compounds of formula (II) or (III) forms the preferred photoinitiator system.

Ferrocene is perhaps the best-known example of a metallocene and its structure and its simple derivatives are represented by structure (I), when R¹ is hydrogen.

Ferrocene compounds when R¹ is $C_1$-$C_4$ alkyl, having one or more R¹ groups present in one or both cyclopentadienyl rings can be prepared according to the process disclosed in European patent application EP-A-0769721.

According to the invention, the term "ferrocene compound" means ferrocene, or ferrocene derivatives that may inadvertently comprise small amounts of oxidized equivalents. The central Fe atom in ferrocene is in the +2 oxidation state. Ferrocene is readily oxidized to ferrocenium wherein Fe is in the +3 oxidation state. Ferrocene-Ferrocenium is well-known redox equilibrium and the co-existence of both species is inevitable in solution under normal ambient conditions.

In the present invention the ferrocene compound significantly improves the photosensitivity for polymerization of ionically (anionically or zwitterionically) susceptible CAs, by interaction with the photolysis products from free radical photoinitiators such as the acylgermane compounds, which are included in the photoinitiator system. In the dark, the ferrocene compound and free radical initiator co-exist in a stable non-polymerised formulation.

Preferably in the compound of formula (I) $R^1$ is selected from hydrogen, that is ferrocene itself, and mono- or disubstituted cyclopentyl rings with $C_1$-$C_4$ alkyl chains. Cyclopentyl rings may be either both be substituted, or only one of them may be substituted.

The preferred concentration range for compound of formula (I) in the composition of the invention is between 50 and 500 ppm by weight, more preferably between 80 and 400 ppm, and still more preferably between 95 and 305 ppm, being ppm parts per million.

Acylgermane Compounds

Acylgermane compounds of formula (II) and (III) can be prepared according to the process disclosed in, for example, European patent application EP-A-1905415. In some cases, for example compound of formula (III), wherein $R^3$ is methoxy, can be obtained commercially under the tradename Ivocerin™ through the company Ivoclar Vivadent AG.

In the composition of the invention, acylgermane compound of formula (III), wherein $R^3$ is methoxy, is preferably used.

The authors of the present invention have surprisingly found that when these acylgermane compounds of formula (II) or (III), used at low concentrations, are combined with ferrocene compound of formula (I) present at the level of about fifty ppm to two hundred ppm, the photopolymerization is efficient, complete, and dry-to-touch, glossy and extensibly colourless adhesives and films result in a few seconds exposure with high reproducibility under equivalent irradiation intensities to those that could not produce photocure with acylgermane alone. That is, ferrocene species act as synergists for acylgermanium photoinitiators in CA photopolymerisations.

Acylgermane compounds of formula (II) and (III) used in the present invention in the photoinitiator system are acid stable. The significance of acid stable photoinitiators is important, since CAs per se must be stabilized by acidic species and may additionally contain or develop small quantities of acids from hydrolysed ester components especially over extended periods of storage.

The preferred concentration of the acylgermane compound of formula (II) or (III) in the present invention is in the range 50 to 6000 ppm by weight in the formulation. When used with CAs containing a second polymerisable functional group in the CA molecule the preferred concentration range is 200 to 5000 ppm. When used with formulations containing monofunctional CAs only or monofunctional CAs admixed with non-CA acrylic monomers, the preferred concentration range is 100 to 2000 ppm by weight, or more preferably 200 to 800 ppm by weight.

Acylgermane compound of formula (IV) can be prepared according to the process disclosed in Sharma et al., J. Organometallic Chem., 1991, 409, 321-330. The acylgermane compound of formula (IV), wherein $R^2$ is phenyl is preferred. Formulations containing this compound or its mixtures with an acylgermane compound of formula (II) or (III), such as Ivocerin™, are photosensitive and produce efficiently cured CA films under the irradiation conditions shown in the Examples.

The preferred concentration of the acylgermane compound of formula (IV) in the present invention is in the range 50 to 1050 ppm by weight in the formulation.

In the present invention the acylgermane compound of formula (IV) is optionally combined with a radical photoinitiator.

A radical photoinitiator is a compound that initiates the polymerization process in a composition comprising monomers that are susceptible to direct radical polymerisation under normal circumstances. As UV or visible light energy is absorbed by the photoinitiator, it fragments into reactive species. These species can be either free radical or cationic. The vast majority of systems are based on free radicals which react with the radically susceptible compounds in the composition. The free radical class of initiators represents greater than 90% of the commercially used initiators, while cationic curing has been more limited in scope.

In the composition of the present invention the photoinitiator is a radical photoinitiator, preferably an alpha cleavage type radical photoinitiator.

The alpha cleavage initiators have a generally highest efficiency due to their generation of free radicals via a unimolecular process: alpha cleavage initiators need only to absorb light in order to generate radicals.

The radical photoinitiator of the alpha cleavage type is selected among benzoin ethers, dialkoxy acetophenones, benzoin, methylphenyl glyoxylate, benzyl dimethyl ketal, 1-hydroxycyclohexyl phenyl ketone, substituted benzophenones, and a compound of structure (II) or (III). Preferably the photoinitiator is selected from methylphenyl glyoxylate, benzyl dimethyl ketal, 1-hydroxycyclohexyl phenyl ketone, and 3,3',4,4'-tetra(t-butylperoxycarbonyl) benzophenone, and a compound of structure (II) or (III). Acylgermane compounds of structure (II) and (III) are also alpha cleavage free radical photoinitiators per se.

When combined with a radical photoinitiator, the preferred concentration of the ferrocenylacylgermane compound of formula (IV) in the present invention is in the range 75 to 250 ppm by weight in the formulation, more preferably 100 to 200, and the preferred concentration of the radical photoinitiator is in the range 900 to 5000 ppm by weight in the formulation, more preferably 1000 to 3000, and yet more preferably 1500 to 2500.

In a preferred embodiment of the invention, the photoinitiator system consisting of a combination of a ferrocene compound of formula (I) and an acylgermane compound of formula (II) or (III) is used. More preferably the ferrocene compound of formula (I) when $R^1$ is hydrogen, and mono- or disubstituted cyclopentyl rings with $C_1$-$C_4$ alkyl chains, and more preferably when $R^1$ is hydrogen. More preferably the acylgermane compound is compound of formula (III), and more preferably compound of formula (III), wherein $R^3$ is methoxy.

A specially preferred embodiment is the combination of ferrocene compound of formula (I) when $R^1$ is hydrogen and acylgermane compound of formula (III) when $R^3$ is methoxy. Specially preferred concentration is from 100 to 250 ppm for compound of formula (I) and from 100 to 6000 ppm for compound of formula (III), and more especially still from 180 to 230 ppm for compound of formula (I), and from 200 to 800 ppm for compound of formula (III).
Monomers In the composition of the invention at least one compound of formula (V) is present. The combination of different compounds of formula (V) in the composition has the advantage that the properties of the cured film can be designed properly fitting the requirements of its final use.

Compound of formula (V) is:
a cyanoacrylate, when A is the CN group and D is a carboxylic ester group, $CO_2R^4$;
methylidene malonate methyl ester, when A and D are the $CO_2Me$ group;
methylidene malonate ethyl ester, when A and D are the $CO_2Et$ group;
1-ethoxycarbonyl-1-ethoxycarbonyl methyleneoxycarbonyl ethane, when A is $CO_2Et$ and D is $CO_2CH_2CO_2Et$, known as MM 2.1.2 according to Breton et al., Eur. J. Pharmaceutics & Biopharmaceutics, 2008, 68, 479-495.

When $R^5$ is H or Me in group of formula (VI) then the ester group D of structure (V) comprises an acrylate or methacrylate respectively and (V) is then a compound with two 'mixed' or "hybrid" functional groups (cyanoacrylate and acrylic). When $R^5$ is CN in (VI), then (V) is a bis-cyanoacrylate. Preferred examples of cyanoacrylate esters with acrylic ester moieties, showing a hybrid or bis nature, include acryloylethyl cyanoacrylate, methacryloyldodecyl cyanoacrylate and 1,6-hexyl biscyanoacrylate.

The esters of general formula (VII) can be defined generically as alkoxyalkyl or alkylsilyloxyalkyl esters, among which the following can be preferentially mentioned: 2-methoxyethyl, 2-ethoxyethyl, 2-propoxyethyl, 2-butoxyethyl, 2-isopropoxyethyl, 2-hexyloxyethyl, 2-amyloxyethyl, 2-ethoxybutyl, 2-methoxypropyl, and 2-(1-methoxy)propyl, trimethylsilyloxyethyl, hexamethyldisiloxanoxyethyl, among others. Other examples of alkoxyalkyl type monomers are described in the U.S. Pat. No. 6,977,278. The alkoxylalkyl cyanoacrylates are low in odour and are non-staining and non-irritant. In a preferred embodiment, in the compound of general formula (V), A is the CN group. In other preferred embodiments $R^7$ is H and $R^8$ is Me or Et and n is 1 that is, in a preferred embodiments the compound of general formula (V) is 2-methoxyethyl cyanoacrylate or 2-ethoxyethyl cyanoacrylate. In another preferred embodiment A is the CN group, $R^7$ is Me, $R^8$ is Me, and n is 1, that is, the compound of general formula (V) is 2-(1-methoxy) propyl cyanoacrylate.

The monomers defined by structure (V) may be solid or liquid in physical form under normal ambient conditions, and may have functions that enable co-polymerisation and crosslinking. Solid monomers may be dissolved in liquid monomers to yield liquid formulations. In the context of the invention, within the monomers substantially odour-free or of low odour, are also included those monomers which are not lachrymatory, and those whose vapours tend not polymerize under ambient conditions to produce white deposits on the substrates to be bonded. These features are associated with low vapour pressures. Thus, for example, when $R^4$ in the compound of general formula (V) is 2-ethylhexyl, furfuryl, cyclohexyl, cyclohexenyl, terminally trialkylsilylmethyl ($C_1$-$C_3$ alkyl), or acryloylethyl cyanoacrylate, methacryloyldodecyl cyanoacrylate and 1,6-hexyl biscyanoacrylate the monomer is substantially odour-free or low odour in addition to the well-known alkoxyalkyl types. Monomers of structure (V) bearing carboxylic esters further comprising structure (VI) have second polymerisable or copolymerisable functional groups and are thus considered to have dual or 'mixed or hybrid' functionality, meaning more than one functional group is present, e.g. two CA groups in one molecule of structure (VI), or one CA functional group combined with one acrylic functional group in one molecule. The functional groups in the monomers may thus respond to only one type of initiating species, as in the case of BisCAs where both CA functions are susceptible to anionic polymerisation, or to two types of initiating species, as in the case of CA-acrylic hybrids wherein the CA part of the molecule responds to anionic initiators and the acrylic part of the molecule responds to free radical initiators.

When at least one monomer of structure (V) is present, then combinations of two or more monomers of structure (V) may be formulated according to particular needs in end application. For example, odour free and stain free cyanoacrylates may be from the alkoxyalkyl CA class or may be from non-alkoxyalkyl CAs mentioned in the preceding paragraph. Alkoxyalkyl CAs are of a more hydrophilic, nature, whereas 2-ethylhexyl CA, or terminally substituted trialkylsilylmethyl CAs are of a more hydrophobic nature. Mixtures of both classes thus allow adjustment of hydrophilicity-hydrophobicity while still producing an odour free formulation. Similarly butyl CA and 2-octyl CA are medical grade CAs used in sutureless bonding and mixtures of these monomers allow adjustment of flexibility of the final cured adhesive by modulating glass transition temperature of the copolymer formed. Furthermore, mixtures of alkoxyalkyl CAs, or even ECA, with bis-CAs lead to crosslinked copolymers by virtue of the dual functionality of the included bis-CAs, and the same will apply to mixtures of any CA with CAs with hybrid CA-acrylic functional groups. Mixtures of CAs, bis-CAs and hybrid CAs also give rise to copolymers with crosslinked structures. Mixed formulations also allow for optimising cost-benefits in formulation depending on needs, for example if inexpensive ECA is acceptable to use, but increased durability is required over what is offered by polyECA, then a more sophisticated CA-acrylic hybrid or bis-CA may be included at relatively low concentration, typically less than 10%, to beneficially transform the properties of polyECA by copolymerisation and crosslinking, without adding excessive cost. It will be understood that the types of mixtures and the relative concentrations of each CA monomer can be regulated to suit the needs of the particular formulation for particular application.

The monomers used as resins, adhesives, sealants or coatings of the invention can be obtained, for example, according to the method described in the U.S. Pat. No. 6,245,933 and the references mentioned therein, or with the method described in the European patent application EP14382127.0. The total concentration of cyanoacrylate in the formulation is between 60% and approximately 99% by weight, preferably between 85% and 97% by weight.

Additional Monomers

Non-instant adhesive type polymerisable or copolymerisable monomers may also be present and are preferably selected from the group generically referred to as acrylates or acrylics. In the context of the invention the wording "acrylates" includes also "methacrylates". Thus, in a preferred embodiment, the composition of the invention comprises at least one acrylate compound selected from a group comprising a compound of formula (V), wherein A is H or methyl, and D is a carboxylic acid or carboxy ester moiety of formula $CO_2R^4$, as defined above, and a polyfunctional acrylate selected from butanediol diacrylate, butanediol dimethacrylate, ethylene glycol diacrylate, ethylene glycol dimethacrylate, triethyleneglycol diacrylate, triethylene glycol dimethacrylate, trimethylolpropane triacrylate (TMPTA), trimethylolpropane trimethacrylate (TMPTMA), pentaerythritol tetraacrylate (PETA), pentaerythritol tetramethacrylate (PETMA), dipentaerythritol pentaacrylate, dipentaerythritol hexaacrylate, and dipentaerythritol penta-/hexaacrylate.

Furthermore such polymerisable species may be mono-functional esters, di-functional esters, poly-functional esters, or have mixed functionality esters for example, may include phosphate esters.

Examples of acrylic monomers are readily available from well-known suppliers such as, for example, Sartomer, Arkema, and BASF.

Polyfunctional acrylic esters types may be of relatively low molecular weight such as the commercially available, triethylene oxide dimethacrylate, or butanediol dimethacrylate, or may be of higher molecular weight, e.g. acrylic ester terminated polymers or copolymers or so-called acrylic ester functionalised telechelic, dendrimeric or hyperbranched materials. The large variety of acrylic systems allow for a great deal of variation in the type of properties achievable in cured systems that contain them. Preferred acrylic monomers are those from the Sartomer Arkema SR and CN series including trimethylolpropane triacrylate (TMPTA), hexanediol diacrylate, tetra- and triethylene glycol diacrylate, pentaerythritol tetraacrylate and preferred concentrations are between 40% and 1%, more preferably between 20% and 2% and most preferably between 15% and 5% by weight.

In compounds of structure (V) when A is CN or $CO_2Et$ and D is the reverse ester group $OCOR^4$, the monomers are acetoxy acrylonitriles or acetoxy acrylates respectively and are suitable as co-formulation components with any of the other abovementioned monomers of structures (V), (VI) or (VII).

Acid Stabilizer Compound

The acid stabilizer compound is an inhibitor of anionic polymerization and is selected from the group of Lewis acids in the composition of the invention. One or more of such stabilizing agents can be used.

The acid stabilizing agents are selected preferably from the group consisting of boron trifluoride, boron trifluoride etherate complex, boron trifluoride dihydrate, trimethylsilyl triflate, sulphur dioxide, and mixtures thereof, most preferably from boron trifluoride etherate complex.

In the composition, the content of acid stabilizer is generally comprised between 0.0015% and 0.0050% by weight, equivalent to 15 and 50 ppm respectively, more preferably 20 to 40 ppm and still more preferably 25 to 35 ppm, with respect to the pure Lewis acid (not complexed) and based on its weight of the composition. For example $BF_3.Et_2O$ formulated at approximately 68 ppm is equivalent to approximately 30 ppm of $BF_3$, which is a preferred concentration.

In an especially preferred embodiment, the inventive compositions contain boron trifluoride adduct such as the etherate complex, alone as acid stabilizer compound.

Radical Stabiliser Species:

The composition of the invention may optionally include radical stabilizer compounds, which help to prevent premature polymerization due any radical mechanism such as autoxidation or thermal polymerisation, while the acid stabilizers, also known as anionic stabilizers, help to prevent premature polymerization of the adhesive due to anionic mechanisms.

The radical stabilizing agents are free radical polymerization inhibitors, and are preferably selected from hindered phenolic or polyphenolic compounds such as, hydroquinone, mono-tertiary-butyl hydroquinone, 2,5-di-tertiary-butyl-hydroquinone, p-methoxyphenol, butylated hydroxyanisole, 2,6-di-tert-butyl-p-cresol, 2,2-methylene-bis-(4-methyl-6-tert-butyl)phenol (MBETBP), p-tert-butyl catechol, 1,3,5-trimethyl-2,4,6-tris(3,5-di-tert-butyl-4-hydroxybenzyl)benzene (Anox 330™, Irganox 1330™), hydroxytoluene butyl ether, and mixtures thereof; more preferably from hydroquinone monomethyl ether, 2,2'-methylene-bis-(6-tert-butyl-4-methylphenol), and mixtures thereof.

In the inventive compositions the radical stabilisers present are a consequence of the production of the raw monomer material and generally no additional radical stabiliser is added to formulation or if added then that is an option and the content of the radical stabilizing agent would generally comprise between 0.01% and 0.7% by weight. In the case of using hydroquinone monomethyl ether, it is preferably used in a range comprised between 0.01% and 0.07% by weight, more preferably between 0.01% and 0.04% by weight based on the total weight.

Additional Components

The compositions of the invention may include additional components such as thickeners, non-reactive fillers, solvents, thixotropic agents, accelerating agent, controllers of the exotherm during cure, plasticizers, modifiers of the refractive index, adhesion promoters, and mixtures thereof, to regulate the properties of the film obtained after photopolymerization.

Viscosity conferring agents (also known as thickeners or thickening conferring agents) serve to modulate the viscosity of formulations, most usually increasing this property. A suitable thickening agent for formulation can be selected from those that are compatible with the monomers to which it is added. Among them can be mentioned poly(meth)acrylates, acylated cellulose polymers, for example cellulose acetate, cellulose acetate propionate, polyvinyl acetates, partially hydrolysed polyvinyl acetates, polyvinylpyrrolidones, polyoxylates, polycaprolactones, polycyanoacrylates, vinyl acetate copolymers, for example, with vinyl chloride, copolymers of (meth)acrylates with butadiene and styrene, copolymers of vinyl chloride and acrylonitrile, copolymers of ethylene and vinyl acetate, poly[butyleneterephthalate-co-polyethyleneglycolterephthalate] and copolymers of lactic acid and caprolactone.

These thickening agents are well known to those skilled in the art and have been described in the prior art. Thus, for example, poly(meth)acrylates are disclosed in the U.S. Pat. No. 3,282,773, copolymers of (meth)acrylates with butadiene and styrene, and copolymers of vinyl chloride and acrylonitrile in the U.S. Pat. No. 4,102,945 or vinyl chloride and vinyl acetate in the U.S. Pat. No. 4,444,933; polyoxylates (polyesters of oxalic acid), polycaprolactones and copolymers of lactic acid and caprolactone in the international patent application WO-A-01/12243; poly[butyleneterephthalate-co-polyethyleneglycolterephthalate] polymer in the international patent application WO-A-2007/049258, polycyanoacrylates in U.S. Pat. No. 2,794,788; the acylated cellulose polymers in the U.S. Pat. No. 3,699,127, and copolymers of vinyl acetate and vinyl chloride in the international patent application WO-A-2004/061030.

Preferably, in the composition of the invention the thickener is selected from the group consisting of poly(meth)acrylates, polycyanoacrylates, polyvinylpyrrolidones, polyvinyl acetates, partially hydrolysed polyvinyl acetates, vinyl acetate copolymers, ethylene-vinyl acetate copolymers, ethylene-vinyl acetate-maleic acid/ester terpolymers, vinyl chloride-vinyl acetate copolymers acylated cellulose polymers, and mixtures thereof; still more preferably are polymethylmethacrylate homopolymer, vinyl chloride-vinyl acetate copolymers, vinyl acetate copolymers, and mixtures thereof, still more preferably is vinyl chloride-vinyl acetate copolymer or a mixture of polymethylmethacrylate homopolymer and vinyl chloride-vinyl acetate copolymer, and still more preferably is polymethylmethacrylate homopolymer with an average molecular weight comprised between 400,000 and 500,000 and vinyl chloride-vinyl acetate copolymers. A particularly preferred vinyl chloride-vinyl acetate copolymer is Vinnol® H40/60 (Wacker Polymers CAS no. 9003-22-9). More than one type of polymeric thickener can be used by admixing any of the aforementioned polymers or copolymers.

The thickener should be dry and substantially free of peroxides to prevent a premature polymerization of the monomer, as described in the European patent application EP-A-0323720.

In the composition of the invention, the thickener, for example polymethylmethacrylate, is usually present in a percentage comprised between 2% and 15% by weight, preferably between 3% and 12% by weight based and more preferably between 4% and 10% by weight. Vinyl chloride-vinyl acetate copolymers are preferably present in a percentage comprised between 5% and 12% by weight.

The composition may also further include non-soluble fillers such as, for example, low density polyethylene powder, polyvinylidene fluoride (PVDF), or polytetrafluoroethylene (PTFE), that also have the effect of conveying thickness or 'body' to formulations. Usually the filler content in the composition is comprised between 2% and 4% by weight, if present.

On some occasions less viscous, less thick formulations may be required, in which case solvents such as ketones, acetates or alkyl silanes may be added to the to dilute photosensitive compositions. This is specially the case when very thin coatings are required, for example for use as primers or sizing agents, or for penetrating into porous parts, especially those that are transparent and/or need dry surface cure quickly. Any diluent solvent that may be present in formulations must obviously not unintentionally adversely affect the parts and substrates to which formulations are applied. Solvents may be present in the range of 5-60% wt/wt of the formulation and more preferably 30-50% wt/wt.

The composition of the invention may include a thixotropic agent in order to regulate the flow behaviour thereof. It may be organic or inorganic and selected from the group consisting of hydrogenated castor oil, hydrogenated castor oil modified by reaction with an amine, polyamides, and silica.

Silica is an inorganic thixotropic agent, and can be selected from the group consisting of hydrophobic fumed or precipitated silica.

The modified castor oil is preferably the product resulting from the reaction between hydrogenated castor oil and an aliphatic diamine, more preferably selected from the group consisting of 1,2-ethanediamine, 1,3-propanediamine and 1,6-hexanediamine, and still more preferably is 1,2-ethanediamine.

The product of the reaction between hydrogenated castor oil and an amine is a complex mixture comprising glycerides and amides, and is substantially free of diamine to avoid stability problems in the polymerisable composition.

The hydrogenated castor oil is commercially available in micronized form under the trade name THIXIN® R (Elementis Specialties), or CRAYVALLAC® ANTISETTLE CVP (Arkema).

The modified hydrogenated castor oil is commercially available, for example, under the trade name EFKA® RM 1900 or 1920 (BASF) in micronized powder form with a mean particle size comprised between 5 and 9 µm; CRAYVALLAC® SF or MT (Arkema), or under the trade name THIXATROL® ST (Elementis Specialties), when the amine is 1,2-ethanediamine.

In the composition of the invention the thixotropic agent is preferably selected from the group consisting of hydrogenated castor oil, THIXATROL® ST, EFKA® RM 1900 or EFKA® RM 1920, CRAYVALLAC® SF and CRAYVALLAC® MT, and more preferably is EFKA® RM 1900 or EFKA® RM 1920, which is well known to the skilled in the art in the field of polymers, such as paints, varnishes and adhesives.

Polyamides are thixotropic agents also well known to the skilled in the art. They are commercially available under the trade name THIXATROL® (Elementis Specialties) and DISPARLON® (Kusumoto Chemicals). Polyamides may require to be activated, that is, dispersed and solvated in the composition, by the action of heat before providing the thixotropic effect. Among them can be mentioned, for example, the polyamides THIXATROL® MAX, DISPARLON® 6100, 6200, 6500, 6600, 6650 or 6750. The activation temperature is provided by the supplier of the polyamide, being generally comprised between 30° C. and 100° C. In other cases, the polyamide is pre-activated or it may be pre-activated and may be dispersed directly in the composition, and does not require the action of heat to confer thixotropy to the system. Among them can be mentioned, for example, DISPARLON® A603-20x, A650-20X, A670-20M, A671-EZ, 6900-20X, or F-9030.

In the composition, the concentration of organic thixotropic agent if present in an amount comprised between 2% and 6% by weight, preferably between 2.5% and 5% by weight.

In another preferred embodiment the thixotropic agent is hydrophobic fumed silica. Hydrophilic fumed silica is commercially available, for example, as AEROSIL® 90, 130, 200 or 380 (Evonik), hydrophobic fumed silica as AEROSIL® R104, R202, R208, R816 or R974 (Evonik), precipitated silica as EBROSIL® PD/GR, S-125PD/GR or SA-60.

In the composition, the concentration of silica if present is in an amount comprised between 3.5% and 5% by weight, more preferably between 3.8% and 4.5% by weight based on the total weight of the composition. When silica is used the acid stabiliser must be carefully selected.

In a preferred embodiment, the composition may comprise a cure speed regulating agent or so-called accelerating agent that increases speed of cure on certain substrates and improved adhesion of the polymerisable composition between the substrates. The presence of the accelerating agent is recommendable in the case of porous or deactivating substrates, such as some types of wood, leather, cork, paper, cardboard and the like.

Accelerating agents are well known in prior art and are described, for example, in the U.S. Pat. Nos. 4,171,416, 4,837,260, 4,980,086 and 4,906,317. The accelerating agents suitable for the composition of the present invention are preferably selected from the group consisting of crown ethers, such as, for example, 15-crown-6 ether, 18-crown-6 ether and dibenzo-18-crown-6 ether; silylated crown ethers; calixarenes tetra-t-butyl esters; and dimethyl ethers of PEG 400, PEG 500, PEG 600 and PEG 1000; more preferably is a crown ether, still more preferably is selected from 18-crown-6 ether and dibenzo-18-crown-6 ether; and still more preferably is dibenzo-18-crown-6.

These accelerating agents are well known to those skilled in the art and are commercially available. For example, crown ethers and calixarene tetra-t-butyl esters available through the company Alfa Aesar, and dimethyl ethers of PEG available through the company Sigma Aldrich.

The accelerating agent, if present, is usually present in an amount comprised between 0.05% and 0.2% by weight based on the total weight of the formulation. When the accelerating agent is dibenzo-18-crown-6, it is generally present in an amount comprised between 0.08% and 0.2% by weight, preferably between 0.1% and 0.15% by weight based on the total weight of the composition; and when the accelerating agent is 18-crown-6, it is generally present in an amount comprised between 0.05% and 0.15% by weight, preferably between 0.07% and 0.1% by weight based on the total weight of the composition.

It will be understood that the structural nature of the monomers per se also enables regulation of cure speed.

Control of the exotherm during cure (heat emitted during polymerisation) of cyanoacrylates has been described in U.S. Pat. No. 6,010,714. Phase change materials such Acronals® (BASF) and waxes are also suitable. Solid CAs that are also susceptible to co-polymerisation with CAs and especially photoinduced co-polymerisation may also be usefully employed in this context if they have melting points within the range of anticipated cure exotherms. Octadecyl CA (Stearyl CA) is a particular example with a melting point of <40° C., thus the structural nature of the monomers per se also enables regulation of cure exotherm.

Control of cure exotherm may be desirable in applications where photocurable compositions are in contact with living human or animal tissue, such as in nail varnishes or nail varnish base coats, or medical dressings for veterinary or human use.

The hardness of the cured formulation may be regulated by adding plasticizers to the composition of the invention. In specific applications, thus, the composition may further comprise a plasticizing agent.

Plasticizers suited for use in compositions containing cyanoacrylates are described in the international patent application WO-A-2010/046412. Among them can be mentioned: acetates such as triacetin; phthalates, such as dioctyl phthalate; trimellitates such as trioctyl trimellitate; adipates such as dimethyl adipate; and benzoates such as diethylene glycol dibenzoate.

The plasticizers to be used in the polymerisable composition of the invention are selected from the group consisting of esters of $C_2$-$C_4$ carboxylic acids with $C_2$-$C_5$ alkyl alcohols having 2-4 hydroxyl groups, for example, ethylene glycol, propylene glycol, glycerine, trimethylolpropane, or pentaerythritol, optionally ethoxylated, preferably from acetates of $C_2$-$C_5$ alkyl alcohols having 2-4 hydroxyl groups, optionally ethoxylated, and more preferably from acetates of $C_2$-$C_3$ alkyl alcohols having 2-3 hydroxyl groups, such as, for example, glycerine triacetate or ethylene glycol diacetate.

Preferably the plasticizing agent is selected from triacetin and ethylene glycol acetate. These plasticizers are commercially available, for example, through the company Oleon Chemicals (Netherlands).

In the case of being present, the plasticizing agent is usually present in a percentage comprised between 10% and 20% by weight, preferably between 15% and 18% by weight, based on the total weight of composition.

Softness may be considered a bulk property, for example a cured silicone is soft. However soft to touch is also within scope of the definition of 'soft'. Haptic coatings for example are soft-to-touch and confer a velvet-like feel and are typically applied on surfaces designed for much contact with the hand, e.g. writing instruments, automotive steering wheels, specialised packaging for gifts, and such like. If present such additives are preferably formulated in the 5-10% by weight range.

It will be understood that the structural nature of the monomers per se enables regulation of properties such as hardness. Thus materials that cure with high glass transitions in their polymers appear glassy and hard, the polymer of methyl CA has a particularly high glass transition (>160° C. 1 Hz, DMTA). Furthermore crosslinking and inclusion of aromatic systems, especially bisphenol-A type cross linkers, e.g. of the dimethacrylates type, enables regulation of hardness and glass-like characteristics that can resist abrasion or scratching and find uses in coatings. Depending on the extent of hardness required such materials may be present in the range of 5-10% by weight.

The composition may include modifiers of the refractive index. Inclusion of fluorine atoms for example in CAs lowers the refractive index and materials of this nature can be used as coatings on optical fibers to encourage confinement of propagating optical signals in higher refractive index fiber cores ('ThreeBond Technical New 34, Jun. 20, 1991, Three Bond Co. Ltd, Tokyo 193-8533, Japan).

Inclusion of certain silicones, metals and heteroatoms in components of formulation act to increase refractive index for example, methacrylates described in U.S. Pat. No. 6,794, 471. Usually, formulation with silicone containing materials requires the use of hydrophobic CAs.

High refractive index affects reflectivity and gloss of coatings. Matched refractive index between coatings and substrates also affects reflectivity and glare. Depending on the application and material type, such materials may be present in ranges of 50-90% by weight.

The composition may further include an adhesion promoter for glass, ceramics, porcelain, plastics and/or metal, for example, alkoxysilane compounds, titanium containing compounds such as Kenrich KR 12, or polysubstituted aromatic acids, such as trimellitic acid.

Usually the content of the adhesion promoter in the inventive composition is comprised between 0.05% and 0.1% by weight, preferably between 0.06% and 0.08% by weight.

It will be understood that the structural nature of the monomers per se also enables regulation of such properties.

Use of the Composition

The use of the light curable adhesive composition for preparing films and coatings by photocuring of the composition is also encompassed by the object of the present invention.

Films and coatings obtained by curing the composition are suitable as tack free coatings, primers for coatings, thin tack free coatings, base coat or top coat on different surfaces such as, for example, wood panel, paper, cardboard, glass, quartz, silicon, plastics, stainless steel, optical fiber, skin, hair, and nails.

In the specific case of nail lacquers, the composition includes usually exotherm control agents inside.

The composition may be applied neat or diluted by a solvent to obtain thin films with thicknesses between 5 μm and 500 μm.

Compositions of the present invention show advantages in the case of preparing thin coatings. In that case, the problem of oxygen inhibiting acrylic curing becomes greater and in some cases, UV curable acrylic resins simply will not cure under UV irradiation in very thin films.

The use of the composition is very broad and can be applied as anti-finger print coatings on stainless steel kitchen furniture, soft-touch or 'haptic' coatings on pencils and handgrips, hydrophobic coatings on electronic devices such as displays, biocide coatings on surfaces and medical devices, low friction coatings on catheters, coatings with modified refractive index, for example lower refractive index than the index of core optical fibers, so as to reduce light loss out of the fibers, photocurable sutures, photocurable coatings containing medication—for example to treat prevailing conditions such as fungal infections on nails, and cosmetic coatings such as nail lacquers and even individually coated hair.

If the use is addressed to a large area, then it is preferably used odourless monomers of formula (V), such as, for example, like 2-methoxyethyl cyanoacrylate.

The skilled person in the art may design the composition by combining the polymerizable monomers and by adding suitable components to obtain, for example, haptic, hydrophobic, temporary, glossy coatings.

Many coating applications can be perceived, tack-free cure alone offers tremendous advantages over current UV curing acrylate based coatings that require nitrogen blanketing in specialized 'UV ovens' to achieve dry coatings on any substrate such as wood, paper, cardboard, etc.—e.g. for the glossy coatings on magazines and books.

Non-oxygen inhibited, or so-called tack free cure, is not only advantageous in the production of photocured films and coatings, but also when bulk cured materials are produced—for example on the 'fillets' of bonded parts when excess adhesive is exuded from bondlines and can be quickly solidified on demand, and furthermore in the production of bulk stepwise or continuous cured resins such as those used in 3DP or CLIP as mentioned earlier.

The light curable adhesive composition is suitable for curing in the bulk, or as an adhesive or sealant applied to parts to be bonded or sealed and to form bulk objects or monoliths by photocuring. Thus, the use of the light curable adhesive composition of the invention for bulk curing to form adhesive bonded parts and bulk objects and monoliths by photocuring is also encompassed by the object of the present invention.

Packaging

The package comprising the light curable adhesive composition of the invention is encompassed by the object of the present invention. The package is light shielded from wavelengths between 300 nm and 750 nm.

Light sensitive compositions, especially visible light sensitive compositions obviously require shielding from light wavelengths that stimulate the decomposition of the photoinitiator system contained within. Shielding from wavelengths between 750 nm and about 300 nm is sufficient to protect the formulations. CA or methylidene malonate compositions per se, require high quality, pure low surface energy plastics, such as HDPE.

Light curing CAs thus preferably require light shielding to prolong shelf stability under light or dark storage conditions. Light shielding maybe be provided by light blocking shrunk wrapped foils on regular CA packaging, irrespective of size, or by co-extruded systems where only the plastic not in contact with the CA contains components to block light such as UV blockers and or carbon based pigments, for example. The latter are known in current prior art and are articles of commerce. Light shielding is also important in use, for example for smaller packs, such as bottles, light shielded lids and nozzles are preferred. In systems wherein large packs are used by dispensing under pressure through tubes, then the feed tubes to the dispense head should be shielded from light. Aluminium cans may also be used to store products from the invention. Such can may require an internal barrier coating.

In certain cases it may be required to use glass containers for light sensitive CAs, for example for marketing purposes to promote products with appeal in cosmetics (e.g. nail varnishes). Normal glass is a reactive surface known to destabilise CAs, however, passivized or internally coated glass may be used. Passivating can be achieved by acid treatment or by barrier layers such as parylene coatings that function as a barrier between glass and CA and are readily deposited by well-known vapour techniques and such coating is offered as a service. Obviously the glass bottles should also obscure light and protect the light sensitive contents and any brush included in such bottles, e.g. for nail varnishes, must be compatible with the contents and these are well-known in the prior art and are commercially available.

In a preferred embodiment the light shielded package comprises the light curing composition of the invention and integrates a means of illuminating the composition once dispensed so as to invoke photocure of the composition. Such a package may be referred to as an 'active' pack or package and is defined below.

Thus, in the preferred embodiment the light shielded package further comprises:
 a) a Light Emitting Diode (LED) emitting at wavelength and intensity suited to invoke photocure of the curable composition once powered on by connections made to a battery or batteries,
 b) a battery or batteries of sufficient voltage to power the LED,
 c) a switching means activate the LED to invoke photocure of the curable composition,
 d) a light shielding nozzle to enable accurate dispensing of the curable composition and to initially pierce open the collapsible tube,
 e) a cap to close the nozzle when the product is not being dispensed,
 and optionally,
 f) a casing with squeezable side panels,
 and optionally
 g) a secondary package such as a blister card to display the product.

More preferably the package comprises a casing with squeezable side panels, and yet more preferably the package comprises a secondary package such as a blister card to display the product.

Suitable light wavelength is from 350 nm to 490 nm, preferably from 365 nm to 465 nm, and more preferably from 400 nm to 410 nm, and light intensity is from 20 mW/cm$^2$ to 150 mW/cm$^2$, preferably from 40 mW/cm$^2$ to 90 mW/cm$^2$, and more preferably 70 mW/cm$^2$.

An active pack, package or device is herein defined as one that enables the end-user to dispense the light curing composition contained within the pack in a first step, then to activate or invoke 'cure-on-demand' of the dispensed light sensitive composition by illuminating with light from a source that is integrated in the same pack, in a second step. The light source may be permanently integrated in the pack or otherwise. The pack or device and its function are described more fully by reference to FIGS. 2-4. The advantage of associating the means of curing with the pack that contains the curable composition is convenience to the end user, since in every incidence where the composition is to be used, the appropriate light source is readily to hand.

Figure 2:
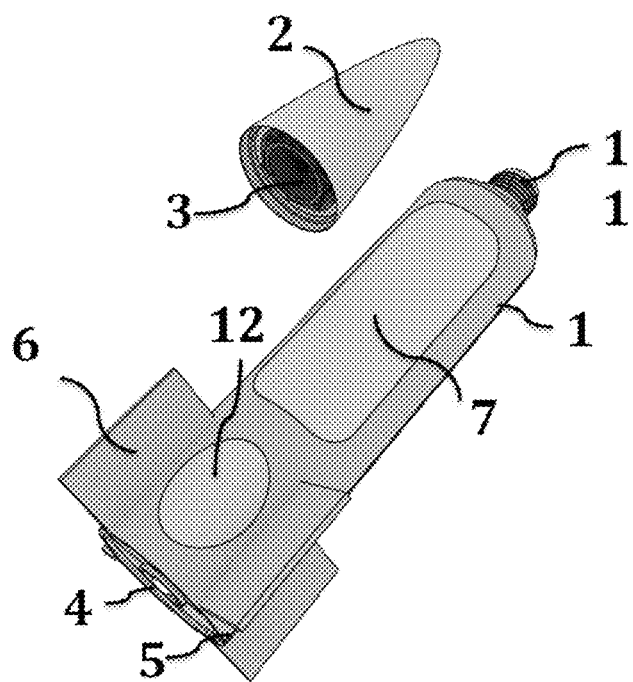
FIG. 2 is a schematic representation of the outer casing of a package for a light curable adhesive composition with a means of illuminating the composition integrated into the package.

FIG. 2 schematically illustrates the outer casing of an active package suited to use with the inventive composition. It comprises a plastic casing 1 and a cap 2, the latter of which includes a nozzle 3. The outer casing is preferably composed of two half-shell casings that are clicked together along their long axis to assemble the pack casing 1. The long seam of the pack may optionally be ultrasonically welded. A light emitting diode 4 (LED) is located in the base of the pack. The base of the casing has a recess defined by rim 5 to enable the device to stand upright without the LED, which may project slightly out of the base, from touching the surface on which the pack may be placed. The pack may optionally be further stabilized to stand in an upright position by additional molded features such as fins 6 that project outwards as shown in the Figures. The outer casing preferably has inlaid squeezable side panels 7.

Figure 3:
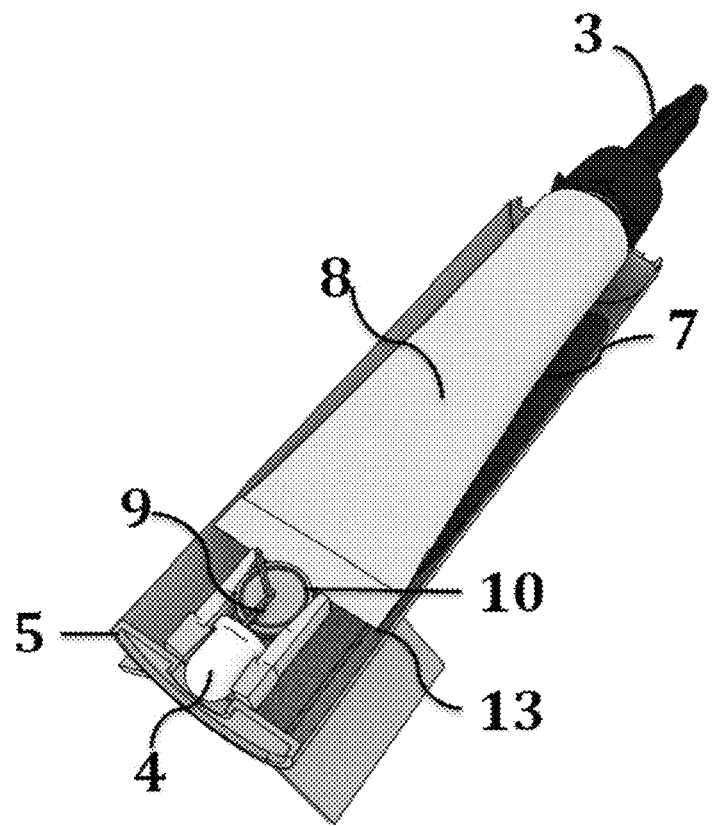
FIG. 3 is a schematic representation of the inside half-shell casing of a package for a light curable adhesive composition showing the integrated means of illuminating the dispensed composition in the form of a light emitting diode (LED) powered by a battery or batteries.

FIG. 3 schematically illustrates an inner view of one half-shell case of the pack or device. The latter contains an inner collapsible tube 8 and shows a backside view of one of the inlaid squeezable side panels 7 and the LED 4 with connections 9 routed to battery 10. Also shown is the nozzle 3 that preferably is light shielding and which attaches to the threaded neck, 11 in FIG. 2, of the tube which projects out of the casing at the proximal end. A cap protects the nozzle when dispensing is not required.

Figure 4A:
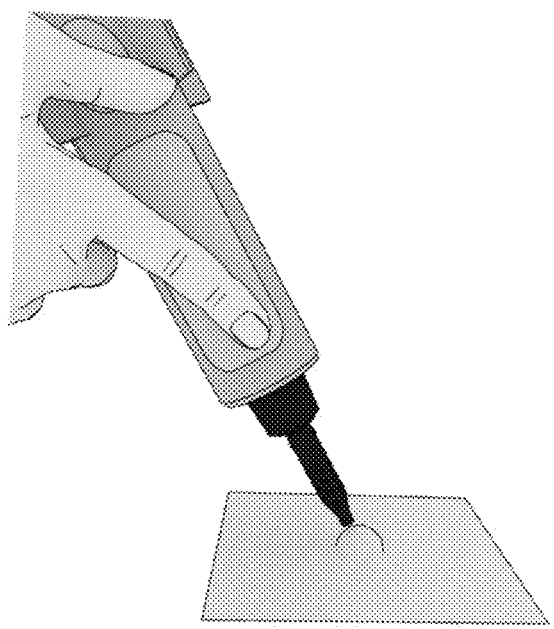
FIG. 4 is a schematic representation illustrating the use of a package for a light curable adhesive composition indicating (a) a first step of dispensing the composition, and (b) a second step of invoking cure of the light sensitive dispensed composition by switch activating the LED that is integrated in the package.
Figure 4B:
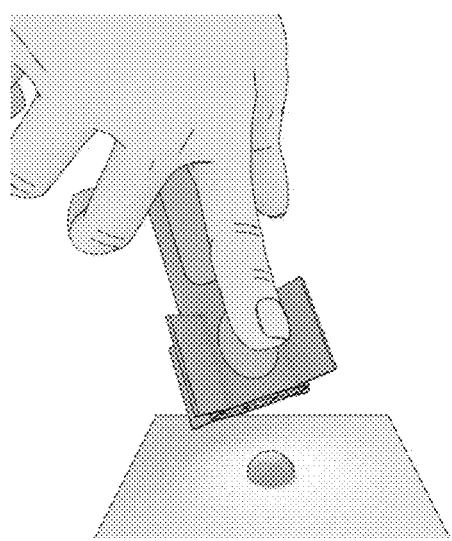

FIG. 4 illustrates schematically how the active pack is used. In a first step FIG. 4(a) a user may dispense the light curable composition by squeezing the side panels that in turn squeeze the inner tube to motivate the composition to flow out or dispense. In a second step FIG. 4(b) a user may cure the light sensitive composition by activating the LED by means of a squeezable inlaid button or switch, 12 FIG. 2, on the exterior of the same device used to dispense the composition. The radiation emitted by the LED is of sufficient intensity and operates at the appropriate wavelengths and for sufficient time to invoke cure of the dispensed composition.

The outer casing may be prepared by injection molding for example. To achieve the rigidity necessary for a robust package, a frame of polypropylene is first injection molded. The molded frames are then introduced into a second mold to enable the squeezable side panels to be injection molded from a thermoplastic elastomer material such as Thermoplastic Polyurethanes (TPUs). In a similar manner a small squeezable area can be made for the switch. The pack cap is also molded from polypropylene and preferably may have a thermoplastic elastomer overmolded to provide extra grip.

Ideally the wavelength emitted light from the LED should couple strongly with the absorption of the light curable composition and be as inexpensive as possible to provide maximum value to the user. A preferred LED operates at 395-400 nm with drive current of 20 mA available from Shenzhen Chanzon Tech Co. Ltd., and is sold with long leads or legs already connected, the anode leg being longer than the cathode leg. Such LEDs are available in various shapes, for example so-called, dome top, flat top, 'straw hat' that enable a degree of focusing or a reduction in overall size or profile. Any type may be used in the active pack. A preferred shape is the dome-top that allows focusing. The size of the LED dictates in part, the size requirements of the cavity within the pack to contain the LED and the battery or batteries that drive it. The LED is push fitted into a semicircular orifice that holds it at the bottom of the pack half-shell casing and in such an orientation that allows one contact lead to locate into a molded trough features (not shown for clarity) in one half-shell which then automatically dictates alignment of the second lead of the LED to be in a position coincident with the switch that is in the other half shell of the pack. The LED thus has one contact permanently connected to one pole of the battery/batteries by a mechanical contact means through use of molded features in the casing that force the LED lead to always touch the battery pole. Mechanical contact means is preferable to facilitate assembly of active packs in mass production since it avoids soldering or physical connection. The second LED contact is not connected to the opposite pole of the battery or batteries, but is held in close proximity to it, so it may make contact easily when mechanically pushed onto the battery by engaging the switch when it is desired to activate the LED. Preferably the end user makes the aforementioned contact by depressing an appropriate inlaid squeezable button, however a simple sliding switch on the exterior of the pack that pushes the free contact lead directly onto the formerly unconnected pole of the battery/batteries is also suitable.

Suitable batteries for the active pack may be of any type for example, the alkaline or lithium ion type. They may be stacked to achieve the appropriate voltage to drive the LEDs. A preferred type is lithium ion CR1220 because of its small size (approximately 12.5 mm diameter and 2 mm thick)—two such batteries deliver slightly more than 6 V which is preferred to provide the power needed to drive the above-mentioned LED to invoke cure in the inventive composition. The battery/batteries also are held in permanent position by molded features in the casing. Batteries are available from many suppliers such as Green Electronics, China.

The curable composition is contained within a collapsible tube inside the casing. The tube can be made of any material that is compatible with the composition it contains. Preferably the tube is made from aluminum which may be specially coated inside or which may be uncoated. Such tubes are widely known in the art of CA packaging and are available from Wys s.l., Barcelona. The proximal end of the collapsible tube has a threaded pedestal that is closed-off with a thin aluminum wall that may be pierced open by engaging the nozzle piece when the composition is first dispensed. The tube is filled from the distal end (13 in FIG. 3) that is subsequently crimped by multiple foldings to flatten the end of the tube and seal it closed. To enable the inner aluminum tube to bounce back after squeezing it may preferably contain a cylindrical plastic insert sleeve that is slightly shorter in length than the tube when crimped and slightly smaller in diameter of the tube. The plastic insert may be made from CA compatible high density polyethylene (HDPE) and may have a continuous solid wall or, have a wall with openings or a mesh or spring like structure. Such inserts have been described, for example, in European Patent Application EP-A-0210052 and U.S. Pat. No. 9,038,857.

The filled, crimped, collapsible tube is clicked into a semicircular orifice in the half-shell of the molded case by its threaded pedestal neck at the end of the casing opposite to the LED. The casing will have been previously prepared by assembling the LED and battery/batteries into one half of the molded part. The pack casing is completed by assembling by the second half shell in such a matter that the squeezable switch is aligned above the normally non-contacting ("off" position) lead of the underlying LED so as to enable the lead to contact to the battery/batteries when desired ("on" position).

The light shielded nozzle is already integrated into the cap and this assembly is not connected to the body of the device but is held close to the device body in a blister pack. Assembling the cap by screwing the nozzle-cap onto the protruding threaded pedestal of the tube enables the proximal end of the tube to be punctured so light curing composition can be subsequently dispensed.

An alternative pack suited to the invention may be realized by modification of the passive pack described of the type described in U.S. Pat. No. 9,038,857 to an active pack by incorporation of and LED and battery in an extended housing of such a pack.

Also known in the art is a metering device described in U.S. Pat. No. 9,022,256 for a light-curing material comprising a squeezable reservoir for containing a light curing material and an LED-battery-switch arrangement for effecting cure of the material once dispensed. The curable composition of the present invention may be used such a device provided the reservoir material is compatible with the composition.

The active package enables the user to dispense and use the curable composition simply as an instant adhesive, or to use the composition as an instant adhesive that may additionally be cured by light when the same dispense device is used to invoke photocure by means of illuminated LED radiation directed at the dispensed composition.

The active pack may be styled in attractive and ergonomic ways to facilitate use and promote appeal by marketing.

The active pack has the advantage that it ensures the appropriate light source needed to invoke photocure of the curable composition is always to hand should the option to photocure the instant adhesive be required. The curable composition still functions as an instant adhesive without photocure and of course may still be cured photocured with an independent light source with appropriate output. The active pack has advantages in consumer, industrial, cosmetic and medical applications. For example dispensed curable composition may be spread and cured to provide a tack free coating on finger nails in cosmetic applications, similarly an appropriate adhesive composition may be photocured after applying over an open wound to act as a hemostat or sutureless bond in medical applications if the composition is a medical quality cyanoacrylate curable deploying the inventive photoinitiation system. Further, the consumer using said active pack, may cure-on-demand any excess instant adhesive that exudes from a bonded part and would otherwise present a nuisance provided the curable composition is used.

The invention comprises the following embodiments:
1.—A light curable adhesive composition comprising:
1) a photoinitiator system selected from
  a) a combination of ferrocene compound of formula (I)

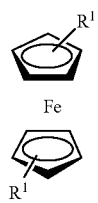
(I)

wherein
$R^1$ is hydrogen or $C_1$-$C_4$ alkyl;
one or more $R^1$ groups are present in one or both cyclopentadienyl rings, and
acylgermane compounds selected from compounds of formula (II) or (III):

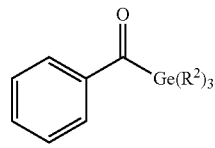
(II)

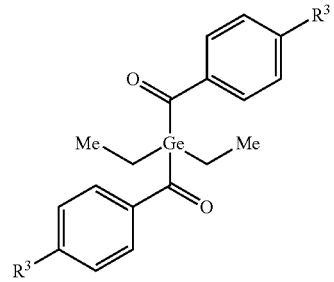
(III)

wherein
$R^2$ is methyl or phenyl, and
$R^3$ is hydrogen or methoxy, and
b) acylgermane compound of formula (IV)

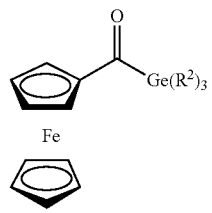
(IV)

wherein
$R^2$ is as defined above, optionally combined with a radical photoinitiator,
2) at least one compound of formula (V)

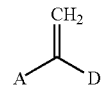
(V)

wherein
A is selected from the group consisting of CN, $CO_2Me$ and $CO_2Et$, and
when A is $CO_2Me$, D is $CO_2Me$;
when A is $CO_2Et$, D is $CO_2CH_2CO_2Et$;
when A is $CO_2Et$, D is $CO_2Et$; and
when A is CN, D is a carboxylic ester moiety $CO_2R^4$,
wherein
  $R^4$ is selected from the group consisting of: $C_1$-$C_{18}$ linear or branched alkyl chain, terminally trimethylsilylated $C_1$-$C_3$ alkyl chain, partially fluorinated —$CH_2CF_3$, —$CH_2CF_2CF_3$, —$CH_2(CF_2)_2H$, —$CH_2(CF_2)_4H$, —$CH(CF_3)CH_3$, allyl, propargyl, cyclohexyl, cyclohexenyl, methylcyclohexyl, methylcyclohexenyl, ethylcyclohexyl, ethylcyclohexenyl, furfuryl, phenylethyl, phenoxyethyl, an acrylic ester moiety of formula (VI):

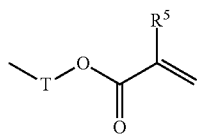

(VI)

wherein
T is: $(CH_2)_z$, wherein the value of z is between 2 and 12 inclusive, or $C_3$-$C_{12}$ branched alkyl chain, preferably $C_3$-$C_8$, and more preferably $C_3$-$C_6$, cyclohexyl; bisphenyl, bisphenol, and $R^5$ is H, Me, CN or $CO_2R^6$, wherein $R^6$ is a methyl or ethyl group;
a group of formula (VII)

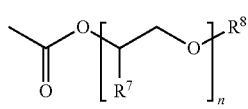

(VII)

wherein
$R^7$ is selected from the group consisting of H and Me, $R^8$ is selected from the group consisting of $Si(Me_3)_3$, and a $C_1$-$C_6$ linear or branched alkyl chain, and the value of n is between 1 and 3 inclusive, and 3) at least one acid stabilizer compound selected from the group of Lewis acids.

2.—A composition according to embodiment 1, characterized in that the photoinitiator system consists of a combination of a ferrocene compound of formula (I) and an acylgermane compound of formula (II) or (III).

3.—A composition according to embodiment 2, characterized in that in the ferrocene compound of formula (I) $R^1$ is selected from hydrogen, and mono- or disubstituted cyclopentyl rings with $C_1$-$C_4$ alkyl chains.

4.—A composition according to embodiment 3, characterized in that in the ferrocene compound of formula (I) $R^1$ is hydrogen.

5.—A composition according to any one of embodiments 1 to 4, characterized in that acylgermane compound is compound of formula (III).

6.—A composition according to embodiment 5, characterized in that in compound of formula (III) $R^3$ is methoxy.

7.—A composition according to any one of embodiments 1 to 6, characterized in that the concentration range for compound of formula (I) in the composition is between 50 and 500 ppm by weight.

8.—A composition according to any one of embodiments 1 to 7, characterized in that the concentration of acylgermane compound of formula (II) or (III) is in the range 50 to 6000 ppm by weight in the formulation.

9.—A composition according to embodiment 1, characterized in that the photoinitiator system is acylgermane compound of formula (IV).

10.—A composition according to embodiment 9, characterized in that the acylgermane compound of formula (IV) is combined with a radical photoinitiator.

11.—A composition according to embodiment 10, characterized in that the radical photoinitiator is an alpha cleavage type photoinitiator.

12.—A composition according to embodiment 10, characterized in that the alpha cleavage type photoinitiator is selected among benzoin ethers, dialkoxy acetophenones, benzoin, methylphenyl glyoxylate, benzyl dimethyl ketal, 1-hydroxycyclohexyl phenyl ketone, and substituted benzophenones, and compound of structure (II) or (III).

13.—A composition according to any one of embodiments 1 to 12, characterized in that in compound of formula (V) A is the CN group and D is a carboxylic ester group, $CO_2R^4$.

14.—A composition according to embodiment 13, characterized in that $R^4$ is $C_1$-$C_{18}$ linear or branched alkyl chain.

15.—A composition according to embodiment 13, characterized in that $R^4$ is a group of formula (VI), wherein T is: $(CH_2)_z$, wherein the value of z is between 2 and 12 inclusive, or $C_3$-$C_{12}$ branched alkyl chain, preferably $C_3$-$C_8$, and more preferably $C_3$-$C_6$, cyclohexyl; bisphenyl, bisphenol, and $R^5$ is H, Me, CN or $CO_2R^6$, wherein $R^6$ is a methyl or ethyl group.

16.—A composition according to embodiment 13, characterized in that $R^4$ is a group of formula (VII), wherein $R^7$ is selected from the group consisting of H and Me, $R^8$ is selected from $C_1$-$C_6$ linear or branched alkyl chain, and n is between 1 and 3.

17.—A composition according to any one of embodiments 1 to 16, characterized in that the composition further comprises at least one acrylate compound selected from a group comprising a compound of formula (V), wherein A is H or methyl, and D is a carboxylic acid or carboxy ester moiety of formula $CO_2R^4$, as defined above, and a polyfunctional acrylate selected from butanediol diacrylate, butanediol dimethacrylate, ethylene glycol diacrylate, ethylene glycol dimethacrylate, triethyleneglycol diacrylate, triethylene glycol dimethacrylate, trimethylolpropane triacrylate (TMPTA), trimethylolpropane trimethacrylate (TMPTMA), pentaerythritol tetraacrylate (PETA), pentaerythritol tetramethacrylate (PETMA), dipentaerythritol pentaacrylate, dipentaerythritol hexaacrylate, and dipentaerythritol penta-/hexaacrylate.

18.—A composition according to any one of embodiments 1 to 17, characterized in that the acid stabilizing agent is selected from the group consisting of boron trifluoride, boron trifluoride etherate complex, boron trifluoride dihydrate, trimethylsilyl triflate, sulphur dioxide, and mixtures thereof.

19.—A composition according to embodiment 18, characterized in that the acid stabilizing agent is boron trifluoride etherate complex.

20.—A composition according to any one of embodiments 1 to 19, characterized in that it furthers contains thickeners, non-reactive fillers, solvents, thixotropic agents, accelerating agent, controllers of the exotherm during cure, plasticizers, modifiers of the refractive index, adhesion promoters, and mixtures thereof.

21.—A composition according to embodiment 20, characterized in that it contains vinyl chloride-vinyl acetate copolymer or a mixture of polymethylmethacrylate homopolymer and vinyl chloride-vinyl acetate copolymer as thickener.

22.—Use of the composition of any one of the embodiments 1 to 21 for preparing films and coatings by photocuring.

23.—Use according to embodiment 22, characterized in that the films and coatings are tack free coatings, primers for coatings, thin tack free coatings, base coats or top coats.

24.—Use according to embodiment 22, characterized in that the films or coatings are applied on wood panel, paper, cardboard, glass, quartz, silicon, plastics, stainless steel, optical fiber, skin, hair, and nails.

25.—Use of any one of the embodiments 1 to 21 for bulk curing to form adhesive bonded parts and bulk objects and monoliths by photocuring.

26.—Use according to embodiment 25 for bulk curing to form bulk objects or monoliths by photocuring.

27.—Package comprising the composition of any one of the embodiments 1 to 21 that is light shielded from wavelengths between 300 nm and 750 nm.

28.—Package according to embodiment 27, which further comprises:
a) a Light Emitting Diode (LED) emitting at wavelength and intensity suited to invoke photocure of the curable composition once powered on by connections made to a battery or batteries,
b) a battery or batteries of sufficient voltage to power the LED,
c) a switching means activate the LED to invoke photocure of the curable composition,
d) a light shielding nozzle to enable accurate dispensing of the curable composition and to initially pierce open the collapsible tube,
e) a cap to close the nozzle when the product is not being dispensed,
and optionally,
f) a casing with squeezable side panels,
and optionally
g) a secondary package such as a blister card to display the product.

Next, several examples of the invention are provided for illustrative purposes that are understood to be non-limiting.

EXAMPLES

Formulations

Light sensitive CA compositions were formulated by mixing metallocene and germane species at room temperature in light shielded opaque high-density polyethylene (HDPE) bottles. Stock solutions and dilutions were used to ensure accuracy of transfer of any species used in low concentrations. In the Examples the term 'ferrocene species' refers to ferrocene (Sigma Aldrich Co.) together with any minor inadvertent oxidized form of ferrocene. When present as individual components, ferrocene was used at a concentration of 200 ppm and the germane species known as Ivocerin™ (Synthon Chemicals GmbH & Co. KG) at a concentration of 1000 ppm unless stated otherwise. CA monomers ECA and MECA were available from Henkel Ireland Ltd. The other monomers were synthesized according to the method described in the literature, for example, U.S. Pat. No. 6,245,933, and (ferrocenylacyl)germanes, in particular compound of formula (IV), wherein $R^3$=phenyl, were synthesized according to the method described in Sharma et al., J. Organometallic Chem., 1991, 409, 321.

Photocuring

Drops of liquid formulation were spread on glass microscope slides to form a liquid film of approximately 50-100 μm thicknesses that was subjected to light cure. To examine whether samples were crosslinked or not, solubility testing was employed. For solubility testing films were prepared on polypropylene or PTFE substrates, so they could be easily removed as freestanding films of several square centimeters in area. Several such films were used for testing to increase sample quantity and increase weighing accuracy. The extent of crosslinking was gauged by measuring the amount of insoluble material after drying to constant weight and is described later.

UV curing was effected using a UV lamp (UVALOC® Loctite Corp) with a measured intensity of 70 $mW/cm^2$ in the sample plane and an accurately timed exposure. The main wavelength was 365 nm. Visible light was effected using an array of blue emitting LEDs with an intensity of 70 $mW/cm^2$ at 465 nm in the sample plane and with an accurately timed exposure.

Photosensitivity was checked after the formulations reached room temperature under using standard irradiation conditions. The formulations were also checked as instant adhesives (i.e. curability without light between substrates) and by measuring fixture time on various substrates. Analysis was also performed to determine total acid content before and after ageing.

Solubility Testing of Photocured Samples

Photocured films were then immersed in acetone for 24 hours after which time these samples were filtered. Acetone was removed from the filtrates and any residue again weighed then re-dissolved and subjected to NMR analysis using deuterated chloroform or acetone as solvent. Polymer in filtrate should be non-crosslinked, e.g., typically from linear polymers or copolymers. Any acetone insoluble fraction was also weighed after drying. The acetone insoluble dry films were subsequently subjected to hot deuterated dimethyl sulfoxide ($d_6$-DMSO) as a solvent in an attempt to re-dissolve these using more aggressive conditions. In some cases dissolution or partial dissolution occurred and NMR spectra were again recorded. No further analysis was conducted on those parts of photocured films that were totally insoluble in any solvent.

Comparative Example 1: Testing of the Photocuring Behaviour of Different CA and Acrylic Monomers in the Presence of a Radical Photoinitiator Compositions were prepared by mixing 99.98% by weight of a specific monomer, 62.8 ppm of $BF_3.Et_2O$ as acid stabilizer and 0.1% or 1% by weight of Ivocerin™, an acylgermane free radical initiator sensitive to both UV and visible light wavelengths, as shown in Table I below.

Tested monomers were: MECA, methoxyethyl 2-cyanoacrylate (compound of structure VIII); ECA ethyl 2-cyanoacrylate (compound of structure IX); and TMPTA, trimethylolpropane triacrylate, (compound of structure X).

Drops of these compositions were spread on microscope slides to give a liquid film of approximately 100 microns in thickness, which was exposed to UV light intensity of 70 $mW/cm^2$, wavelength of 365 nm. In a similar fashion visible light irradiance of 70 $mW/cm^2$ and wavelength 465 nm for periods of 3 seconds to minutes.

TABLE I

| Comparative Example | Monomer | Radical photoinitiator (%) | Photocuring UV light |
|---|---|---|---|
| 1A | MECA | 0.1 | No, even after 60" |
| 1B | ECA | 0.1 | No, even after 60" |
| 1C | MECA | 1.0 | Yes, yellow after 60" minimum |
| 1D | ECA | 1.0 | Yes, yellow after 60" minimum |
| 1E | TMPTA | 0.1 | Yes after 3" |

No photocure was seen in Examples 1A or 1B. Photocure was carried out under more forcing conditions in Examples 1C and 1D, using UV light at the intensity indicated at high photoinitiator concentrations (~1.0% by weight) and with prolonged exposure (~60 seconds). Under such conditions the cured films retained some yellow colour.

Example 1D, which includes an acrylate monomer, TMPTA, provided efficient cure after 3 seconds under both lighting conditions.

This example shows that Ivocerin™, when used alone at low concentrations, is not a practical photoinitiator for CA polymerization, but it is a very efficient photoinitiator for the free radical polymerization of acrylic monomers as expected.

The results for visible light cure followed the same trend as in Table 1.

Example 1: Testing of the Photocuring Behaviour of CA and Acrylic Monomers in the Presence of Ferrocene and a Radical Photoinitiator Compositions 1.1 to 1.7 were prepared by mixing 99.87% by weight of a monomer, 62.8 ppm of $BF_3.Et_2O$ as acid stabilizer, 200 ppm of ferrocene and 0.1% by weight of Ivocerin™, Compositions 1.8 to 1.11 were prepared by mixing monomers, 62.8 ppm of $BF_3.Et_2O$ as acid stabilizer, 200 ppm of ferrocene and 0.5% by weight of Ivocerin™ as shown in Table II below. In the mixtures, the amount of monomer 2 was 5% by weight, monomer 3 was 5% by weight, and the amount of monomer 1 was 94.87% or 89.47% by weight respectively.

Tested monomers were: MECA, methoxyethyl 2-cyanoacrylate; ECA ethyl 2-cyanoacrylate; TMPTA, trimethylolpropane triacrylate, (compound of structure X); butyl cyanoacrylate (compound of structure XI); trimethylsilylmethyl cyanoacrylate (compound of structure XII); and CAA (compound of structure XIII).

Drops of these compositions were spread on microscope slides to give a liquid film of approximately 100 microns in thickness, which was exposed to UV light intensity of 70 mW/cm$^2$, wavelength of 365 nm for 3 seconds or even at exposure times of minutes. In a similar fashion visible light irradiance of 70 mW/cm$^2$ and wavelength 465 nm for periods of 3 seconds was tested.

TABLE II

| Example | Monomer 1 | Monomer 2 | Monomer 3 |
|---------|-----------|-----------|-----------|
| 1.1 | MECA | — | — |
| 1.2 | ECA | — | — |
| 1.3 | BCA | — | — |
| 1.4 | XII | — | — |
| 1.5 | TMPTA | — | — |
| 1.6 | ECA | TMPTA | — |
| 1.7 | MECA | TMPTA | — |
| 1.8 | ECA | CAA (XIII) | — |
| 1.9 | MECA | CAA (XIII) | — |
| 1.10 | ECA | CAA | TMPTA |
| 1.11 | MECA | CAA | TMPTA |

In all cases photocuring was complete after 3 seconds irradiation and films of excellent structural form resulted. It is to note that replacing CA monomer with a polyfunctional acrylate TMPTA, no perceivable difference was noted; that is, the presence or absence of ferrocene made no difference to the efficient polymerization of the triacrylate as expected and unlike the case when CA is used.

In all the above mentioned compositions efficient photocure occurred in 3 seconds under the exposure conditions indicated when tested after one, two and four months storage at room temperature.

As shown in control experiments, ferrocene species used alone with identical concentrations also do not enable photocuring of the CAs, nor of TMPTA.

Example 2: Testing of the Properties of the Photocured Films from CA and Acrylic Monomers in the Presence of Ferrocene and a Radical Photoinitiator Compositions were prepared by mixing 94.47% by weight of monomer 1, 5% by weight of monomer 2, 62.8 ppm of $BF_3.Et_2O$ as acid stabilizer, 200 ppm of ferrocene and 0.5% by weight of Ivocerin™, as shown in Table III below. In the case of ternary mixtures, the amount of monomer 2 was 5% by weight, monomer 3 was 5% by weight, and the amount of monomer 1 was 89.47% by weight.

Tested monomers were: MECA, methoxyethyl 2-cyanoacrylate; ECA ethyl 2-cyanoacrylate; TMPTA, trimethylolpropane triacrylate, (compound of structure X); CAA (compound of structure XIII); dual functional CA, BisCA (compound of structure XIV); hybrid CA and methacrylate CAMA (compound of structure XV).

Efficient photocured films were produced in 3 seconds under both UV and visible conditions following the experimental procedure and the specified intensities of Example 1. The photocured film was immersed in 10 ml of acetone and stirred in a stopped vial for 24 hrs. Insoluble material was filtered off and dried to constant weight.

TABLE III

| Example | Monomer 1 | Monomer 2 | Monomer 3 | Insoluble film (%) |
|---------|-----------|-----------|-----------|--------------------|
| 2.1 | MECA | BisCA (XIV) | — | 97 |
| 2.2 | MECA | CAA (XIII) | — | 47 |
| 2.3 | ECA | BisCA (XIV) | — | 95 |
| 2.4 | ECA | CAA (XIII) | — | 92 |
| 2.5 | MECA | CAMAC (XV) | — | 97 |
| 2.6 | MECA | BisCA | CAA | 96 |
| 2.7 | ECA | BisCA | CAA | 85 |
| 2.9 | MECA | BisCA | TMPTA | 95 |
| 2.10 | ECA | BisCA | TMPTA | 90 |
| 2.11 | MECA | CAA | TMPTA | 80 |
| 2.12 | ECA | CAA | TMPTA | 70 |

The photocured film obtained with the monomer composition of Example 2.1 showed that 97% of the original was insoluble.

When dual functionality CAs were used with two different functional groups (e.g. one CA and one acrylic function—so-called 'hybrids') partially insoluble films resulted. Thus, in Example 2.2, when CAA (structure XIII) is present, the solubilization test with acetone provided 47% of insoluble material.

Replacement of MECA with ECA in Examples 2.3 and 2.4 resulted efficient photocuring. Insoluble material was filtered off and dried to constant weight. 95% of the original was insoluble when BisCA was present. This example demonstrates photo co-polymerisation and crosslinking and modification of properties, for example relative to the case of monofunctional CAs only. The solubilization test with acetone provided 92% of the insoluble material when CAA replaced BisCA.

In Example 2.5, BisCA of Example 2.1 was replaced by CAMAC, which is a hybrid of a CA and a methacrylate of structure XV. 97% of the original was insoluble.

These examples, 2.1-2.5, demonstrate photo co-polymerisation and some crosslinking and modification of properties, for example relative to cases with monofunctional CAs only. In the latter case, when monofunctional CAs were used alone, acetone soluble films resulted and no (0%) insoluble material was observed.

The hybrid is only present at a relatively low concentration (5% by weight).

In Example 2.6 both dual functional CA and BisCA (structure XIV) are included, and a hybrid CA is CAA (Formula XIII). The solubilization test with acetone provided 96% of insoluble material.

In Example 2.7, MECA was substituted by ECA. The solubilization test with acetone provided 96% of insoluble material.

These examples, 2.6 and 2.7, demonstrate photo co-polymerisation and crosslinking and modification of properties, for example relative to formulations containing monofunctional CAs only, even though this is an 'all CA' type formulation. The hybrid is only present at a relatively low concentration.

In Example 2.8 a ternary mixture of monomers was used, MECA, TMPTA and BisCA. The solubilization test with acetone provided 95% of insoluble material. This example demonstrates photopolymerisation of two independent systems (one polyCA and one polyacrylate), both of which have crosslinks to produce crosslinking and interpenetrating systems.

In Example 2.9, MECA was substituted by ECA. The solubilization test with acetone provided 90% of insoluble material. This example demonstrates photopolymerisation of two independent systems, both of which have crosslinks.

In Example 2.10, the monomer mixture comprises CA, hybrid CA (CAA, Formula XIII), and TMPTA. The solubilization test with acetone provided 80% of insoluble material. This example demonstrates photopolymerisation of two interacting systems to produce networks with crosslinks based on insolubility. Monofunctional MECA and TMPTA mixtures without CAA photo copolymerize to produce films that are partially soluble.

In Example 2.11, MECA of Example 2.10 was replaced by ECA. Efficient photocured films resulted. The solubilization test with acetone provided 70% of insoluble material. This example demonstrates photopolymerisation of two interacting systems to produce networks.

In all cases above, UV or visible light could be used to effect photopolymerisation under the intensities and wavelengths previously mentioned in Example 1. Solubility data shown in Example 2 refer to samples photopolymerised by UV light only.

The soluble fraction of the films and the insoluble fraction thereof, once solubilized in hot $d_6$-DMSO, were subjected to $H^1$-NMR analysis and provided information on the constitution of the polymer obtained after photocuring compositions of the invention using ferrocene and the radical photoinitiator Ivocerin™ disclosed in that example.

Example 3: Accelerated Ageing of Compositions

A comparison was made on the accelerated ageing of formulations that contained:
  a) a ferrocene species—acylgermane photoinitiating system for CA from the current invention, and
  b) a ferrocene species—diphenyl-(2,4,6-trimethylbenzoyl)phosphi-ne oxide (TPO), photoinitiating system for CA from the current state-of-the-art under equivalent conditions.

Furthermore, control experiments on formulations containing TMPTA in place of CA and either of the two systems above were performed. The formulations were prepared with the composition shown in Example 1.1 using MECA as the CA monomer and interchanging photoinitiators in comparative tests. The controls switched MECA for TMPTA as the monomer with each photoinitiator for comparative tests.

Formulation ageing was conducted in all cases in (i) light shielded stoppered glass vials that had been passivated by acid washing followed by rinsing with water and baking dry, and (ii) exactly the same without passivation treatment. Ageing conditions exposed the formulations to 82° C. for 7 days duration in the dark. Samples were checked visually, checked for photoresponsiveness under the equivalent UV irradiation conditions used throughout, and checked for instant adhesiveness in the case of the CA samples.

The following Table IV summarizes the compositions and the ageing results:

TABLE IV

| Example | Monomer 1 | Photoinitiator system | Ageing |
|---|---|---|---|
| 3.1 | MECA | Ferrocene species - TPO | Sample in vial fully bulk polymerized and subsequent testing of photoresponse and instant adhesive response was not possible whether or not the vial was first passivated. |
| 3.2 | MECA | Ferrocene species - Acylgermane of structure (III) | Sample in vial remains a low viscosity fluid liquid sample, photopolymerises in 3 secs to dry-to-touch glossy film and bonds clean mild steel lapshear test substrates in <10 sec, irrespective of whether the vial was passivated or not. |
| 3.3 | TMPTA | Ferrocene species - TPO | Sample in vial (passivated or not) remains a fluid liquid that photocures to a glossy film. |
| 3.4 | TMPTA | Ferrocene species - Acylgermane of structure (III) | Sample in vial (passivated or not) remains a fluid liquid that photocures to a glossy film. |

The control experiments (3.3 and 3.4) with TMPTA indicated that the integrity of either TPO or acylgermane photoinitiators is not compromised in the presence of ferrocene species at 82° C. for prolonged periods, so that the instability observed in experiment (3.1) in the case of TPO is particular in a CA environment. However the equivalent experiment, under equivalent conditions and even in a CA environment reported by experiment (3.2) shows stability, sensitivity and functionality of the compositions of the invention.

Example 4: Coatings with Light Curable CA Compositions

Coating of Wood Panel

Formulations prepared in Example 1.1 (MECA as CA) and 1.2 (ECA as CA) were used to coat a large wood fiberboard panel of dimensions 5 cm×20 cm to which a decorative wood grain effect paper was laminated. No odour was evident from the MECA based formulation. A drawdown bar was used to deposit the liquid film coating in a uniform manner. The CA coating of approximately 40 μm thickness was cured under UV light intensity of 70 mW/cm², wavelength of 365 nm for 3 seconds to produce a uniform glossy dry-to-touch coating. In a similar fashion visible light intensity of 70 mW/cm² and wavelength of 465 nm was used to produce dry-to-touch coatings in <5 seconds. Adhesion tests were conducted on the coating according to ASTM 3359. Zero failure occurred (no detachment of isolated 1 mm×1 mm squares in a peel test with Scotch™ tape) indicating a high level of adhesion between the photocurable formulation and the substrate.

In a comparative experiment with a UV curing commercial acrylate coating formulation, tack free cure did not result after UV irradiation even after 30 seconds and when thinner films were coated from this material, no curing at all occurred under UV irradiation in ambient air conditions.

The same experiment was conducted after the photosensitive CA formulation of Example 1.1 (MECA as CA) was diluted by ethyl acetate at a concentration of 50% and produced a film much thinner than 40 um. The sample was cured under UV light intensity of 70 mW/cm$^2$, wavelength of 365 nm for 3 seconds to produce a uniform glossy dry-to-touch coating. In a similar fashion visible light intensity of 70 mW/cm$^2$ and wavelength of 465 nm was used. Adhesion tests were conducted on the coating according to ASTM 3359. Zero failure occurred indicating a high level of adhesion between the photocurable formulation and the substrate.

Coating of Glass

Formulation from Example 1.4 using Trimethylsilylmethyl CA in place of MECA was used to coat a glass slide of dimensions 2 cm×8 cm. No odour was evident. The sample was cured under UV light intensity of 70 mW/cm$^2$, wavelength of 365 nm for 3 seconds to produce a uniform glossy dry-to-touch coating. In a similar fashion visible light intensity of 70 mW/cm$^2$ and wavelength of 465 nm was used. Contact angle measurements using a drop of distilled water showed the sample to be of a hydrophobic nature (water drop angle approximately 68°) relative to an equivalent experiment using MECA where the contact angle was 45°. Measures of contact angle were obtained with the 'Golden Ratio' software.

Coating of Nails

Formulation of Example 1.1 (MECA as CA) was applied with a brush as a top coating over a coloured nail lacquer ('Big Apple Red', Gelcolor OPI) on the right hands of 3 individual girl volunteers. The left hands were treated in the same way except the topcoat was a commercial UV curing acrylate (Gelcolor Top Coat, OPI). The CA coatings were cured with a commercial 'nail varnish lamp' (13W D'Orleac Professional Power) with blue LEDs, in 1 second. The UV acrylate samples required 30 seconds cure under same conditions and were still not tack free. No exotherm was experienced during irradiation or cure of either sample under these conditions. Durable, high gloss, tack free coatings resulted and remained in tack in excellent condition for the duration of a weeklong test wherein the volunteers exposed their hands to washing and normal wear conditions for the CA sample. However for the UV acrylate varnish, peeling of the topcoat was evident after some time depending on wear and for the CA under same conditions no peeling whatsoever was noticed.

Coating of Skin

Formulation with the same composition as in Example 1.1 but using medical grade BCA (structure XI) in place of MECA or ECA was applied as a liquid film with a brush directly on human skin that had a minor fresh cut. The liquid film was photocured in 3 secs with visible light to prevent bleeding from the cut.

Example 5: Bonding with Light Curable Compositions

An acrylic moulded shell from a hearing aid assembly was mounted atop a hearing aid faceplate assembly that bears the electronic components for the device. Formulation from Example 1.1 was dispensed at the joint between the shell and faceplate. The shell was adjusted to ensure all the components contained within atop the faceplate were well positioned while the light curable composition seeped into the joint between shell and faceplate. When the components were adjusted correctly, they were exposed to UV light and fixed in place rapidly. The bonded assembly of shell to faceplate was strong. The faceplate was trimmed and then abraded with a sanding disc until it had the same footprint as the wide end of the shell. The CA bonded parts withstood all trimming and sanding operations due to strong bonding.

Example 6: Bulk Curing of Light Curable CA Compositions

Liquid films of compositions from either Examples 1.1 or 2.1 were photocured on a water soluble polyvinyl alcohol film in 3 seconds or less. Subsequent layers of liquid films were applied already photocured films and again cured in 3 seconds or less. The process was repeated to simulate stepwise photopolymerisation such as that used in 3DP (three dimensional printing), up to a non-limiting thickness of approximately 1.5 mm. The water soluble film was dissolved away to leave a bulk cured CA object. The object from Example 2.1 was essentially insoluble in acetone.

A liquid bead sample of compositions from either Examples 1.1 or 2.1 were subjected to photocure on a water soluble polyvinylalcohol film. The bead was approximately 5 mm wide by 5 centimetres long. The majority of the bead was shielded from light by an aluminium plate so that only the first 0.5 cm could be initially exposed. The sample was photocured and the sample was continuously retracted from below the stationary shield exposing more of the bead sample until eventually it was completely exposed. Total exposure took approximately 15-20 seconds. After exposure the entire bead was cured and the polyvinyl alcohol film was dissolved away to produce a monolith made in a continuous way. The monolith from Example 2.1 was essentially insoluble in acetone.

Example 7: Thickened Light Curable CA Composition

Compositions were prepared by mixing 92.87% by weight of methoxyethyl cyanoacrylate (MECA), 7% by weight of copolymer Vinnol® H40/60, 62.8 ppm of BF$_3$.Et$_2$O as acid stabilizer, 200 ppm of ferrocene and 0.1% by weight of Ivocerin™, The formulation was stable after accelerated ageing tests conducted with continuous exposure to 82° C. for 3 days and behaved as an instant adhesive as well as an efficient photocurable adhesive, curing in 3 seconds exposure to visible light as previously specified. The sample had an initial viscosity of 254 cP at 25° C. measured by Brookfield viscometer with spindle 14 at 100 rpm. With an additional 3% extra copolymer, and 3% less MECA, the viscosity was 461 cP under same conditions. The unthickened version has a viscosity of approximately 10 cP at 25° C.

Example 8: Bonding with Light Curable Composition

Compositions were prepared by mixing 99.47% by weight of monomer MECA, and 62.8 ppm of BF$_3$.Et$_2$O as acid stabilizer, 200 ppm of ferrocene and 0.03% by weight of Ivocerin™. The composition cured in 10 seconds under the 13W D'Orleac Professional Power) with blue LEDs and in 3 seconds under UV light with the intensity previously specified.

Example 9: Composition with a Methylidene Malonate Monomer

The methylidene malonate monomer 1-ethoxycarbonyl-1-ethoxycarbonylmethylenoxycarbonyl ethene, also known as MM 2.1.2 (see for example, Breton, P. et al., Eur. J. Pharmaceutics and Biopharmaceutics, 2008, 68, 479-495; and WO-A-00/47242) was prepared following substantially the method previously described in Example 35 of WO-A-2015/150882, using malonate 1-ethoxycarbonyl-1-ethoxycarbonylmethylenoxycar-bonyl malonate instead of diethyloxycarbonyl malonate. The yield of isolated monomer was approximately 70% with more than 97% purity after careful distillation. A drop of the pure unformulated monomer bonded two glass microscope slides together in less than 3 seconds. The monomer was characterized by NMR as follows: H1 NMR of MM 2.1.2 (CDCl3): 6.69 (dd, 2H), 4.76 (s, 2H), 4.32 (q, 2H, J=7.00), 4.26 (q, 2H, J=7.00), 1.35 (t, 3H, J=7.00), 1.31 (t, 3H, J=7.00 Hz).

Monomer MM 2.1.2 was formulated as outlined in Tables V and VI below to give two formulations admixed with two different types of cyanoacrylates (CAs):

TABLE V

| Entry | Material | Function | Percent by weight |
|---|---|---|---|
| 1 | Methoxyethyl CA | Monomer | 69.92% |
| 2 | MM 2.1.2 | Monomer | 29.96% |
| 3 | Ferrocene | Synergist | 200 ppm |
| 4 | Ivocerin ™ | Radical photoinitiator | 0.1% |
| | | TOTAL | 100.00 |

This composition is a light sensitive formulation containing 70% of Methoxyethyl CA and 30% of MM 2.1.2.

TABLE VI

| Entry | Material | Function | Percent by weight |
|---|---|---|---|
| 1 | N-Butyl CA | Monomer | 69.92% |
| 2 | MM 2.1.2 | Monomer | 29.96% |
| 3 | Ferrocene | Synergist | 200 ppm |
| 4 | Ivocerin ™ | Radical photoinitiator | 0.1% |
| | | TOTAL | 100.00 |

This composition is a light sensitive formulation containing 70% of N-butyl CA and 30% of MM 2.1.2.

Each formulation was independently spread on microscope slides to give liquid films of approximately 100 μm in thickness. Each sample was independently exposed to UV light intensity of 70 mW/cm², wavelength of 365 nm for 3-5 seconds. In a similar fashion visible light irradiation of intensity 70 mW/cm² and wavelength 465 nm for period of around 5 seconds was tested. In all cases the films cured in less than 7 seconds exposure. Similar results were obtained when the formulation described in Table VI was applied to human skin and photocured.

Example 10: Active Package

The curable composition of Example 7 was filled into an uncoated coated aluminum tube. The tube was inserted into a molded part with a robust polypropylene frame that had soft TPU inlaid side panels after assembling an LED in the base of the molded part. A purple round topped LED emitting at 395-400 nm from Canzon was used and powered by two CR1220 batteries held together in series. The batteries were assembled such that the cathode was in permanent contact with the negative pole of the battery stack. The longer anode of the LED was held above the positive pole of the battery stack in a position that was within the reach of the squeezable side panels of the molded part. The prototype pack was assembled so as to enable switching of the LED by pressing on the squeezable side panels, to simulate a squeezable switch, of the custom molded part. A nozzle was screwed onto the filled tube pedestal and the curable composition was dispensed onto a glass microscope slide. The dispensed drops were spread to form a wet film of approximately 100 am thickness. The LED was activated and held approximately 1 cm above the liquid film and scanned across it so all the film was exposed. After 3-5 seconds the composition had cured to a tack free transparent coating. In a second experiment a drop of curable composition was dispensed onto a fingernail and it was spread with a small clean brush taken from a nail varnish bottle. Again the composition photocured in the same manner by illuminating with the same source as described above to give a tack free glossy coating in a few seconds.

The curable composition was checked in its function as an instant adhesive in a separate experiment without photocure. It was dispensed from the active pack onto a beech wood substrate and a second similar substrate was pressed onto the dispensed drop. The composition bonded the two wooden parts in approximately 5 seconds without the use of light. The excess material exuded from between bonded wooden parts was exposed to the LED light in the pack and photocured within 3 seconds of exposure to give a dry fillet of adhesive outside the bondline.

All these experiments were repeated with curable compositions described in Example 1.1 and Example 1.3 showing analogous performance.

The invention claimed is:

1. A light curable adhesive composition comprising:
   1) a photoinitiator system selected from
      a) a combination of ferrocene compound of formula (I)

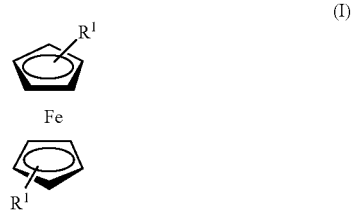

wherein $R^1$ is hydrogen or $C_1$-$C_4$ alkyl;

one or more $R^1$ groups are present in one or both cyclopentadienyl rings, and acylgermane compounds selected from compounds of formula (II) or (III):

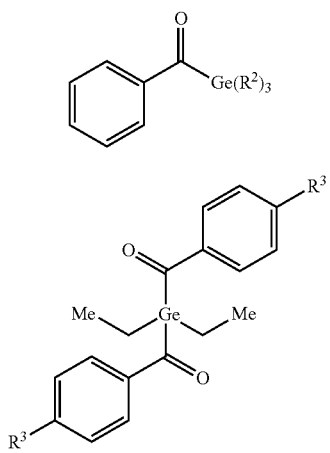

(II)

(III)

wherein
R² is methyl or phenyl, and
R³ is hydrogen or methoxy, and
b) acylgermane compound of formula (IV)

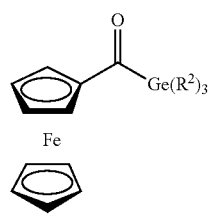

(IV)

wherein
R² is as defined above, optionally combined with a radical photoinitiator,
2) at least one compound of formula (V)

(V)

wherein
A is selected from the group consisting of CN, $CO_2Me$ and $CO_2Et$, and
when A is $CO_2Me$, D is $CO_2Me$;
when A is $CO_2Et$, D is $CO_2CH_2CO_2Et$;
when A is $CO_2Et$, D is $CO_2Et$; and
when A is CN, D is a carboxylic ester moiety $CO_2R^4$, wherein
R⁴ is selected from the group consisting of: $C_1$-$C_{18}$ linear or branched alkyl chain, terminally trimethylsilylated $C_1$-$C_3$ alkyl chain, partially fluorinated —$CH_2CF_3$, —$CH_2CF_2CF_3$, —$CH_2(CF_2)_2H$, —$CH_2(CF_2)_4H$, —$CH(CF_3)CH_3$, allyl, propargyl, cyclohexyl, cyclohexenyl, methylcyclohexyl, methylcyclohexenyl, ethylcyclohexyl, ethylcyclohexenyl, furfuryl, phenylethyl, phenoxyethyl, and an acrylic ester moiety of formula (VI):

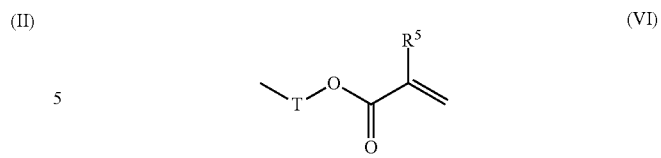

(VI)

wherein
T is: $(CH_2)_z$, wherein the value of z is between 2 and 12 inclusive, or $C_3$-$C_{12}$ branched alkyl chain, bisphenyl, bisphenol, and R⁵ is H, Me, CN or $CO_2R^6$, wherein R⁶ is a methyl or ethyl group;
a group of formula (VII)

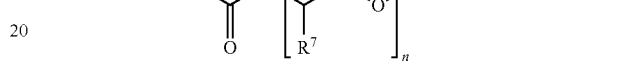

(VII)

wherein
R⁷ is selected from the group consisting of H and Me, R⁸ is selected from the group consisting of $Si(Me_3)_3$, and a $C_1$-$C_6$ linear or branched alkyl chain, and the value of n is between 1 and 3 inclusive, and
3) at least one acid stabilizer compound selected from the group of Lewis acids.

2. The composition according to claim 1, wherein the photoinitiator system is acylgermane compound of formula (IV).

3. The composition according to claim 2, wherein the acylgermane compound of formula (IV) is combined with a radical photoinitiator.

4. The composition according to claim 3, wherein in the at least one compound of formula (V) A is the CN group and D is a carboxylic ester group, $CO_2R^4$.

5. The composition according to claim 4, wherein R⁴ is a group of formula (VII), wherein R⁷ is selected from the group consisting of H and Me, R⁸ is selected from $C_1$-$C_6$ linear or branched alkyl chain, and n is between 1 and 3.

6. The composition according to claim 5, wherein the composition further comprises at least one acrylate compound selected from a group consisting of a compound of formula (V), wherein A is H or methyl, and D is a carboxylic acid or carboxy ester moiety of formula $CO_2R^4$, as defined above, and a polyfunctional acrylate selected from butanediol diacrylate, butanediol dimethacrylate, ethylene glycol diacrylate, ethylene glycol dimethacrylate, triethyleneglycol diacrylate, triethylene glycol dimethacrylate, trimethylolpropane triacrylate (TMPTA), trimethylolpropane trimethacrylate (TMPTMA), pentaerythritol tetraacrylate (PETA), pentaerythritol tetramethacrylate (PETMA), dipentaerythritol pentaacrylate, dipentaerythritol hexaacrylate, and dipentaerythritol penta-/hexaacrylate.

7. The composition according to claim 6, wherein the at least one acid stabilizer compound is selected from the group consisting of boron trifluoride, boron trifluoride etherate complex, boron trifluoride dihydrate, trimethylsilyl triflate, sulphur dioxide, and mixtures thereof.

8. The composition according to claim 7, wherein the composition further comprises additional components selected from the group consisting of thickeners, non-reactive fillers, solvents, thixotropic agents, accelerating agent, controllers of an exotherm during cure, plasticizers, modifiers of a refractive index, adhesion promoters, and mixtures thereof.

9. The composition according to claim 8, wherein the composition comprises vinyl chloride-vinyl acetate copolymer or a mixture of polymethylmethacrylate homopolymer and vinyl chloride-vinyl acetate copolymer as thickener.

10. The composition according to claim 4, wherein $R^4$ is $C_1$-$C_{18}$ linear or branched alkyl chain.

11. The composition according to claim 4, wherein $R^4$ is a group of formula (VI), wherein T is: $(CH_2)_z$, wherein the value of z is between 2 and 12 inclusive, or $C_3$-$C_{12}$ branched alkyl chain, bisphenyl, bisphenol, and $R^5$ is H, Me, CN or $CO_2R^6$, wherein $R^6$ is a methyl or ethyl group.

12. The composition according to claim 1, wherein the photoinitiator system consists of a combination of a ferrocene compound of formula (I) and an acylgermane compound of formula (II) or (III).

13. A package comprising the light curable adhesive composition of claim 1, wherein the package is light shielded from wavelengths between 300 nm and 750 nm.

14. The package according to claim 13, wherein the package contains the light curable adhesive composition within a collapsible tube, and the package further comprises:
a) a Light Emitting Diode (LED) emitting at a wavelength and an intensity suited to invoke a photocure of the light curable adhesive composition once powered on by connections made to a battery or batteries,
b) a battery or batteries of sufficient voltage to power the LED,
c) a switching means to activate the LED to invoke the photocure of the light curable adhesive composition,
d) a light shielding nozzle to enable accurate dispensing of the light curable adhesive composition and to initially pierce open the collapsible tube,
e) a cap to close the nozzle when the light curable adhesive composition is not being dispensed, and optionally,
f) a casing with squeezable side panels, the collapsible tube being located inside the casing, and optionally,
g) a secondary package such as a blister card to display the light curable adhesive composition.

15. A method for preparing films and coatings, comprising:
applying the light curable adhesive composition of claim 1 as a liquid film or liquid coating; and
photocuring the light curable adhesive composition to obtain a film or coating.

16. A method for bulk curing to form adhesive bonded parts, comprising:
applying the light curable adhesive composition of claim 1 as a liquid between two parts; and
photocuring the parts to form adhesive bonded parts.

17. A method for bulk curing to form bulk objects or monoliths, comprising:
applying the light curable adhesive composition of claim 1 as a liquid film;
photocuring the light curable adhesive composition to obtain a first film;
applying subsequent layers of the light curable adhesive composition as liquid films over the first film; and
photocuring after each application of the subsequent layers to form a bulk object or monolith.

18. A film or coating formed from a photocured light curable adhesive composition according to claim 1.

19. Adhesive bonded parts comprising two parts with a cured light curable adhesive composition according to claim 1 between the parts.

20. A bulk object or monolith, comprising cured layers of the light curable adhesive composition of claim 1.

* * * * *